(12) United States Patent
Endo et al.

(10) Patent No.: US 7,737,852 B2
(45) Date of Patent: Jun. 15, 2010

(54) WHEELED VEHICLE MOUNTED WITH RFID TAG, RFID TAG, SPEED MEASUREMENT SYSTEM, AND SPEED MEASUREMENT METHOD

(75) Inventors: Yuta Endo, Atsugi (JP); Noriaki Uto, Isehara (JP); Satohiro Okamoto, Isehara (JP)

(73) Assignee: Semiconductor Energy Laboratory Co., Ltd, Atsugi-shi, Kanagawa-ken (JP)

( * ) Notice: Subject to any disclaimer, the term of this patent is extended or adjusted under 35 U.S.C. 154(b) by 292 days.

(21) Appl. No.: 11/902,387

(22) Filed: Sep. 21, 2007

(65) Prior Publication Data

US 2008/0074273 A1    Mar. 27, 2008

(30) Foreign Application Priority Data

Sep. 22, 2006    (JP)    ............................. 2006-257822

(51) Int. Cl.
G08B 13/14    (2006.01)
(52) U.S. Cl. .................................................. 340/572.1
(58) Field of Classification Search .............. 340/572.1, 340/572.4, 572.8, 539.11, 539.13, 904, 905, 340/936, 426.15, 466; 701/50, 96; 235/375, 235/381, 361
See application file for complete search history.

(56) References Cited

U.S. PATENT DOCUMENTS

| | | | |
|---|---|---|---|
| 5,929,778 A * | 7/1999 | Asama et al. ............ | 340/10.51 |
| 6,121,880 A | 9/2000 | Scott et al. | |
| 6,275,157 B1 | 8/2001 | Mays et al. | |
| 6,519,514 B2 | 2/2003 | Mizutani | |
| 6,894,624 B2 | 5/2005 | Kim et al. | |
| 7,277,809 B1 * | 10/2007 | DeWitt et al. ............... | 702/96 |
| 7,296,736 B2 | 11/2007 | Yamagiwa | |
| 2001/0023380 A1 | 9/2001 | Mizutani | |
| 2003/0006901 A1 | 1/2003 | Kim et al. | |
| 2005/0139664 A1 | 6/2005 | Yamagiwa | |
| 2006/0064236 A1 * | 3/2006 | Hayashi ....................... | 701/117 |
| 2006/0149464 A1 | 7/2006 | Chien | |

(Continued)

FOREIGN PATENT DOCUMENTS

JP    10-105892    4/1998

(Continued)

OTHER PUBLICATIONS

International Search Report (Application No. PCT/JP2007/068213) dated Nov. 13, 2007.

(Continued)

*Primary Examiner*—Van T. Trieu
(74) *Attorney, Agent, or Firm*—Eric J. Robinson; Robinson Intellectual Property Law Office, P.C.

(57) ABSTRACT

An RFID tag having a memory portion for holding information on a wheeled vehicle is mounted on the wheeled vehicle, and an external interrogator and the RFID tag exchange information with each other. Further, an RFID tag having a memory portion for holding information on a wheeled vehicle and a communication device for exchanging information with the RFID tag are set on the wheeled vehicle. When the external interrogator and the RFID tag exchange information with each other, the communication device holds information of a situation, for example, speed information, information on date and time, and the like in the memory portion in the RFID tag.

13 Claims, 15 Drawing Sheets

U.S. PATENT DOCUMENTS

2006/0180647 A1 * 8/2006 Hansen ................ 235/375

FOREIGN PATENT DOCUMENTS

| JP | 11-312282 | | 11/1999 |
|----|-----------|---|---------|
| JP | 2001/255937 | | 9/2001 |
| JP | 2001-307287 | | 11/2001 |
| JP | 2003-192022 A | * | 7/2003 |
| JP | 2003-346283 | | 12/2003 |
| JP | 2004-503125 | | 1/2004 |
| JP | 2004-265249 | | 9/2004 |
| JP | 2005/104451 | | 4/2005 |
| JP | 2005-135262 | | 5/2005 |
| JP | 2005-190040 | | 7/2005 |
| JP | 2005-284376 | | 10/2005 |
| JP | 2005-284476 | | 10/2005 |
| JP | 2005-310131 | | 11/2005 |
| JP | 2006-107315 | | 4/2006 |
| JP | 2006-189415 | | 7/2006 |
| JP | 2006/209300 | | 8/2006 |
| JP | 2006-232029 | | 9/2006 |
| WO | WO 00/73990 | | 12/2000 |
| WO | WO 02/03560 | | 1/2002 |
| WO | WO 2005/093647 | | 10/2005 |

OTHER PUBLICATIONS

Written Opinion (Application No. PCT/JP2007/068213) dated Nov. 13, 2007.

* cited by examiner 600 602

604

606  608  610

612  614  616

624  622  618  620

626　　　　　　　　630　　　　　　　　628

632

634

WHEELED VEHICLE MOUNTED WITH RFID TAG, RFID TAG, SPEED MEASUREMENT SYSTEM, AND SPEED MEASUREMENT METHOD

TECHNICAL FIELD

The present invention relates to a wheeled vehicle mounted with an RFID tag, an RFID tag, a speed measurement system, and a speed measurement method.

BACKGROUND ART

Conventionally, speed monitoring of wheeled vehicles, using automatic speed check equipment, is performed. Automatic speed check equipment is placed at capital highways, roadsides where speeding occurs frequently or the like, the speed of wheeled vehicles, which are driven with exceeding the legal speed (speed limit), is measured, and the car registration plates and drivers of the wheeled vehicles are photographed. If speeding is detected by the automatic speed check equipment, a notification is sent to a possessor of the wheeled vehicle at a later date based on the photograph.

However, the automatic speed check equipment is extremely large-scaled equipment, and there is a problem that the automatic speed check equipment cannot be placed other than at a specific region. In addition, in the case of using the conventional automatic speed check equipment, it is necessary to post a sign indicating placement of the automatic speed check equipment in the advance due to issues such as the rights of portrait, because the driver and the like are photographed. Therefore, it is possible for drivers to drive the wheeled vehicles with speed that is dropped to the legal speed or less only in the specific region where the automatic speed check equipment is placed, and to drive the wheeled vehicles with speed that exceeds the legal speed in other regions.

Moreover, there is a problem of malfunction in the automatic speed check equipment. In the automatic speed check equipment that operates automatically as its name suggests, regular and detailed maintenance is required for the properties thereof and the purpose of placement. However, since the automatic speed check equipment is large-scaled equipment, the burden of maintenance becomes large, and the detailed maintenance is difficult. Therefore, there are a quite a few cases that the automatic speed check equipment operates even if the wheeled vehicles drive within the legal speed. Furthermore, in such a case, it is difficult to prove the malfunction.

In recent years, a large number of new monitoring systems of speed and the like have been proposed; however, such systems also have many problems. For example, a system for monitoring and measuring speed using ETC (Electronic Toll Collection: automatic toll collection system) is proposed in References 1 and 2 (Japanese Published Patent Application No. 2003-346283 and Japanese Published Patent Application No. 2006-107315). The system is to obtain information on wheeled vehicles and personal information with the use of an IC card for ETC, utilizing a gate for ETC placed at toll roads and highways and a car-mount device for ETC. Even in such a system, a problem of the equipment being large scale is not solved, and whether or not the car-mount device is set depends on an individual. Moreover, there is a problem that it is easy to turn on/off the car-mount device. That is, there is difficulty in using the above system to "crackdown on speeding" that is very public, in terms of fairness.

A system for warning an alert on the car-mount device of the speeding wheeled vehicles using a car-mount device for VICS (vehicle information and communication system) and an optical beacon (+an ID detector) is proposed in Reference 3 (Japanese Published Patent Application No. H11-312282). In the system, there are also problems that the device is large scale, turning on/off the car-mount device is easy, and whether or not the car-mount device is set depends on the individual. Furthermore, there is a problem that the vehicle ID is not fixed. Therefore, such a system is unsuitable for using crackdown on speeding and the like.

In each proposal of References 1 to 3, a solution to the problem of malfunction that has exited conventionally is not proposed. If malfunction occurs, a method for verifying malfunction does not exit.

DISCLOSURE OF INVENTION

In accordance with the above-described, crackdown using automatic speed check equipment of which placement regions are defined becomes just nominal crackdown and does not suppress driving with excessive legal speed. Although it may be considered that the above problems are solved by increasing the placement number of equipment and monitoring all roads substantially, it is not practical in view of cost for placement. Furthermore, for the purpose of crackdown on speeding, the problem of malfunction is serious.

In view of the above problems, it is an object of the present invention to provide a wheeled vehicle or the like that is effective for obtaining speed information and the like.

Further, it is an object of the present invention to provide a speed measurement system of which degree of freedom of a placement region is expanded, a speed measurement method, and the like. It is another object to provide a speed measurement system that can reduce malfunction, of which maintenance is easy, a speed measurement method, and the like. Furthermore, it is still another object to provide a speed measurement system that is capable of verifying whether or not malfunction has occurred in a case where malfunction occurs, and the like.

The present invention is to efficiently perform, for example, crackdown on speeding by mounting an RFID tag having a memory portion for holding information on a wheeled vehicle on the wheeled vehicle, and performing communication between an external interrogator and the RFID tag. The interrogator may be able to read the information stored in the RFID tag. The interrogator may be able to write the information to the storage of the RFID tag.

In the present invention, in a case where an RFID tag having a memory portion for holding information on a wheeled vehicle and a communication device that communicates with the RFID tag are set on the wheeled vehicle, and where an external interrogator and the RFID tag communicate with each other, the communication device holds information of a situation, for example, speed information, time and date, and the like in the memory portion in the RFID tag. Accordingly, if the system malfunctions, whether or not malfunction occurs can be verified.

Further, in the present invention, an RFID tag having a memory portion for holding information on a wheeled vehicle, a battery that can be charged, and a charge control circuit is used. Accordingly, the RFID tag can operate by power from the battery, and a response speed can be improved. A probability of malfunction can be reduced.

It is to be noted that a reader/writer that can be used in the present invention is small compared with a conventional speed detection device, and it can be carried around.

One aspect of the present invention is a wheeled vehicle including an RFID tag provided with a memory portion for holding information on a wheeled vehicle, where the memory portion holds identification information on a wheeled vehicle, and the RFID tag sends identification information on a wheeled vehicle to a interrogator in a case of receiving a signal from the interrogator.

Another aspect of the present invention is a wheeled vehicle including an RFID tag provided with a memory portion for holding information on a wheeled vehicle and a communication device for communicating with the RFID tag, where the memory portion holds identification information on a wheeled vehicle, the RFID tag sends identification information on a wheeled vehicle to a interrogator in a case of receiving a signal from the interrogator, the communication device sends speed information that is measured by the wheeled vehicle to the RFID tag in a case where communication is performed between the RFID tag and the interrogator, and the RFID tag holds the speed information that is measured by the wheeled vehicle in the memory portion.

Another aspect of the present invention is a wheeled vehicle including an RFID tag provided with a memory portion for holding information on a wheeled vehicle, a battery that can be charged, and a charge control circuit, where the memory portion holds identification information on a wheeled vehicle, the charge control circuit examines whether or not a voltage of the battery reaches a given value and charges the battery in a case where the RIFD tag receives a signal from a interrogator, and the RFID tag sends identification information on a wheeled vehicle to the interrogator.

Another aspect of the present invention is a wheeled vehicle including an RFID tag provided with a memory portion for holding information on a wheeled vehicle, a battery that can be charged, and a charge control circuit, and a communication device for communicating with the RFID tag, where the memory portion holds identification information on a wheeled vehicle, the charge control circuit examines whether or not a voltage of the battery reaches a given value and charges battery in a case where the RFID tag receives a signal from a interrogator, the RFID tag sends identification information on a wheeled vehicle to the interrogator, the communication device sends speed information that is measured by the wheeled vehicle to the interrogator in a case where communication is performed between the RFID tag and the interrogator, and the RFID tag holds the speed information that is measured by the wheeled vehicle in the memory portion.

In the above structure, the RFID tag may be attached to any of a mirror portion, a light portion, and a window portion of a wheeled vehicle.

One aspect of the present invention is an RFID tag including a memory portion for holding information on a wheeled vehicle, a battery that can be charged, and a charge control circuit, where the memory portion holds information on a wheeled vehicle and sends information on a wheeled vehicle to a interrogator in a case of receiving a signal from the interrogator, and the charge control circuit examines whether or not a voltage of the battery reaches a given value and charges the battery.

Another aspect of the present invention is an RFID tag including a memory portion for holding information on a wheeled vehicle, a battery that can be charged, and a charge control circuit, where the memory portion holds information on a wheeled vehicle and sends information on a wheeled vehicle to a interrogator in a case of receiving a signal from a interrogator, and the charge control circuit examines whether or not a voltage of the battery reaches a given value and charges the battery in a case where the voltage of the battery does not reach the given value.

One aspect of the present invention is a speed measurement system including a first interrogator and a second interrogator which detect information on an RFID tag set on a wheeled vehicle and are placed to have a given distance between the first interrogator and the second interrogator, and an information processing unit connected to the first interrogator and the second interrogator, where after the first interrogator detects identification information on a wheeled vehicle held in a memory portion in the RFID tag, the second interrogator detects identification information on a wheeled vehicle held in the memory portion in the RFID tag; and the information processing unit includes a first unit for holding information on date and time in detecting the identification information on a wheeled vehicle by the first interrogator, a second unit for holding information on date and time in detecting the identification information of a wheeled vehicle by the second interrogator, a unit for calculating a difference of time between the first information on date and time and the second information on date and time, and a unit for calculating average speed based on a difference of time between the first information on date and time and the second information on date and time and based on a distance between the first interrogator and the second interrogator.

In the above structure, the information processing unit may be a computer. The first interrogator and the second interrogator, and the information processing unit may be connected with or without a wire.

Another aspect of the present invention is a speed measurement system including a first interrogator and a second interrogator which detect information on an RFID tag set on a wheeled vehicle and are placed to have a given distance between the first interrogator and the second interrogator, and a computer connected to the first interrogator and the second interrogator, where after the first interrogator detects identification information on a wheeled held in a memory portion in the RFID tag, the second interrogator detects the identification information on a wheeled vehicle held in the memory portion in the RFID tag; and the computer holds a first information on date and time in detecting the identification information on a wheeled vehicle by the first interrogator and a second information on date and time in detecting the identification information on a wheeled vehicle by the second interrogator, and calculates average speed of a wheeled vehicle between the first interrogator and the second interrogator by calculating a difference of time between the first information on date and time and the second information on date and time.

In the above structure, the computer may be a server computer or a computer connected to a lower part of the server computer. The wheeled vehicle may have a communication device for communicating with the RFID tag. Further, the RFID tag may be provided with a battery that can be charged and a charge control circuit. Furthermore, the first interrogator and the second interrogator, and the computer may be connected with or without a wire.

One aspect of the present invention is a method for measuring speed including the steps of placing a first interrogator and a second interrogator, which detect information on an RFID tag set on a wheeled vehicle, to have a given distance between the first interrogator and the second interrogator, measuring date and time of the wheeled vehicle passing through the first interrogator by detecting identification information on a wheeled vehicle held in a memory portion in the RFID tag by the first interrogator, measuring date and time of the wheeled vehicle passing though the second interrogator by detecting identification information on a wheeled vehicle held in the memory portion in the RFID tag by the second interrogator, determining a difference between date and time of the wheeled vehicle passing through the first interrogator and date and time of the wheeled vehicle passing through the second interrogator, and calculating average speed of the wheeled vehicle based on the difference of date and time and the distance between the first interrogator and the second interrogator.

In the above structure, when the first interrogator or the second interrogator detect the identification information on a wheeled vehicle, the memory portion in the RFID tag may hold speed information that is individually measured by the wheeled vehicle. Further, when the first interrogator or the second interrogator detect the identification information on a wheeled vehicle, the battery in the RFID tag may be charged.

It is to be noted that the above information on a wheeled vehicle may include any of identification information on a wheeled vehicle, speed information, information on date and time, information on theft, information on accident history, information on restoration history, information on tax payment, and information on penalty payment.

The above information on a wheeled vehicle is not particularly limited as long as it is information on a wheeled vehicle. The above identification information on a wheeled vehicle (vehicle ID) may be a vehicle number, a license number, or another identification information.

In addition to a method in which two interrogators are used as described above, a method for calculating speed using one interrogator is considered. As a method for calculating speed using one interrogator, for example, a method using a communication distance that is kept constant between a interrogator and an RFID tag is given. In the method, time at which detection of identification information on a wheeled vehicle starts and time at which detection of identification information on a wheeled vehicle is completed are measured, whereby time needed for the wheeled vehicle passing through the communication distance is calculated. Accordingly, a simpler speed detection system can be constructed.

By using the wheeled vehicle and the speed measurement system of the present invention, crackdown on speeding becomes easy.

If malfunction of the system occurs, whether or not malfunction has occurred can be easily verified.

A interrogator for exchanging information with an RFID tag set on a wheeled vehicle is a small device, and it can be carried, for example, when police officers go on patrol. Thus, it produces a large effect on finding stolen vehicles, revelation of illegal parking, or the like.

BEST MODE FOR CARRYING OUT THE INVENTION

Figure 1A:
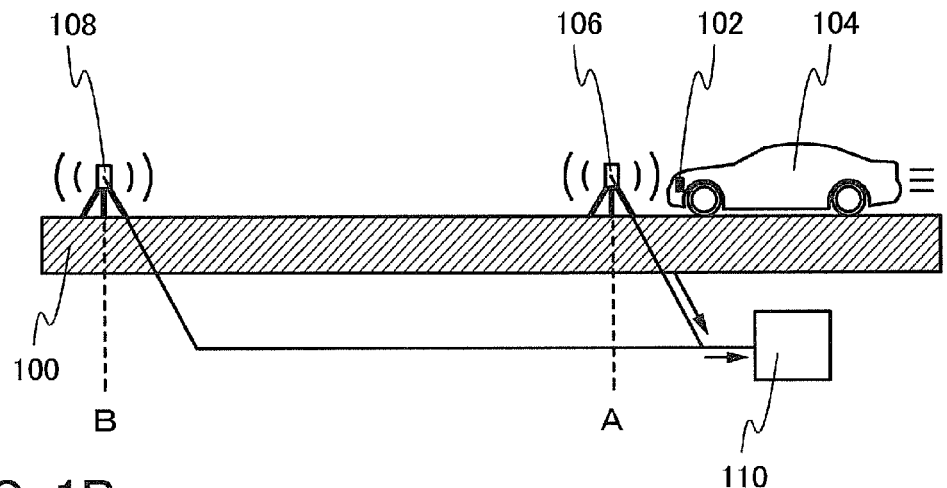
FIGS. 1A to 1C are views illustrating a method for measuring speed of the present invention.

Hereinafter, embodiment modes of the present invention will be described in detail with reference to the accompanying drawings. However, the present invention is not limited to the following description, and it is easily understood by those skilled in the art that various changes and modifications are possible, unless such changes and modifications depart from the content and the scope of the invention. Therefore, the present invention is not construed as being limited to the description of the following embodiment modes. It is to be noted that like portions in the drawings may be denoted by the like reference numerals in a structure of the present invention to be given below.

In addition, the present invention can be applied to a semiconductor device which uses any of frequency modes, for example, a long wave band (135 kHz or the like), a short wave band (6.78 MHz, 13.56 MHz, 27.125 MHz, 40.68 MHz, or the like), an ultra-short wave band (433.92 MHz, 869.0 MHz, 915.0 MHz, or the like), a microwave band (2.45 GHz, 5.8 GHz, 24.125 GHz, or the like), or the like without being limited to a specific frequency mode to be used. A frequency mode may be selected as appropriate depending on request of a communication distance, directivity, or the like. Although a semiconductor device that sends and receives data used in the present invention is called an RFID (Radio Frequency IDentification) tag, an RF tag, an RF chip, a wireless tag, a wireless processor, a wireless memory, an IC (Integrated Circuit) tag, an IC label, an electronic tag, an electronic chip, or the like, the semiconductor device is uniformly referred to as an "RFID tag" in the present specification.

Embodiment Mode 1

In this embodiment mode, a wheeled vehicle mounted with an RFID tag and brief description of a speed measurement system using the wheeled vehicle will be described with reference to FIGS. 1A to 6E.

Figure 1B:
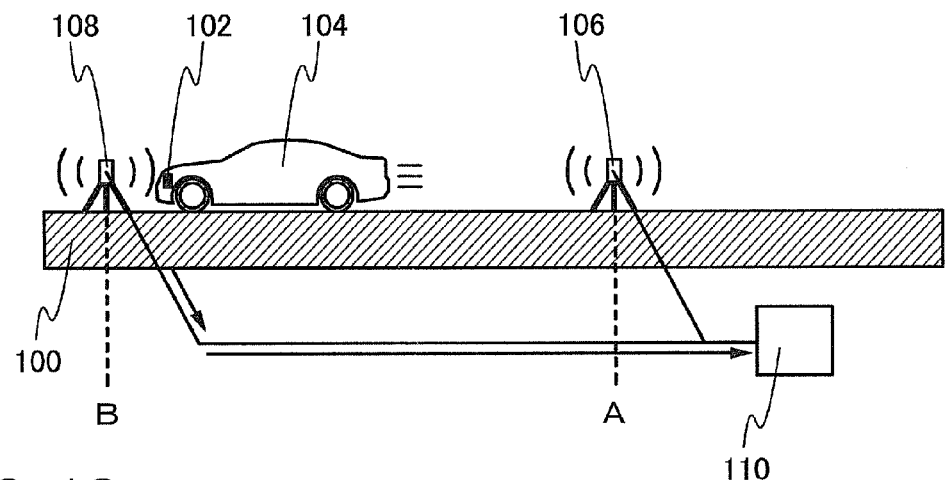
Figure 1C:
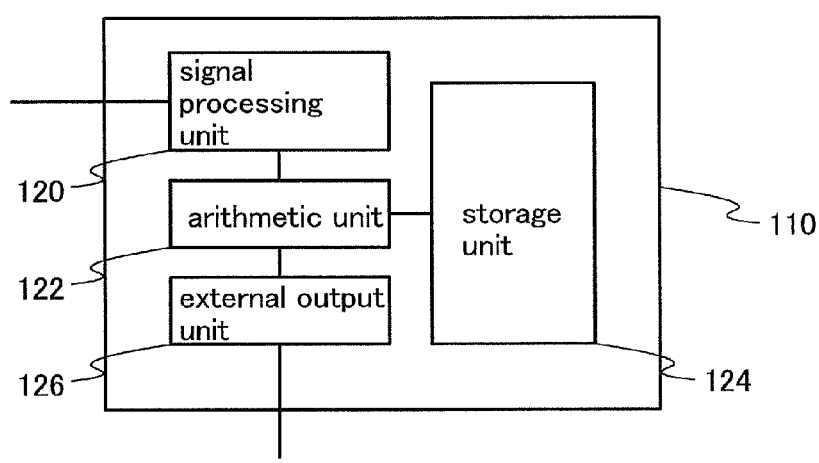

FIGS. 1A to 1C show a typical example of a method for measuring speed. In FIGS. 1A to 1C, an RFID tag 102 is mounted on a wheeled vehicle 104, which has a memory portion that holds unique vehicle identification information on a wheeled vehicle (hereinafter, referred to as vehicle ID). The wheeled vehicle 104 approaches a first interrogator 106 placed on a road 100 or passes through the interrogator 106 (see FIG. 1A). At this time, the first interrogator 106 sends vehicle ID that is obtained by communication with an RFID tag to a server computer 110 that is network-connected. The server computer 110 holds the vehicle ID and information on date and time of the vehicle ID obtained by the first interrogator 106, simultaneously.

Next, the wheeled vehicle 104 approaches a second interrogator 108 or passes through the second reader/wrier 108 (see FIG. 1B). At this time, the server computer 110 holds vehicle ID and information on date and time of the vehicle ID obtained by the second interrogator 108, simultaneously, with the similar procedure in a case where the wheeled vehicle 104 passes through the first interrogator 106.

After that, the server computer 110 extracts a pair of date and time with the same vehicle IDs and calculates a difference thereof. In other words, the sever computer 110 calculates the time period that is needed for the wheeled vehicle 104 driven from a point A where the first interrogator 106 is placed to a point B where the second interrogator 108 is placed.

A distance between the point A and the point B is measured in advance and the distance is divided by the time period that is calculated by the above method, whereby average speed between the point A and the point B can be determined.

In a case where the average speed exceeds legal speed, the server computer holds data of date and time, a place (including unique ID assigned to the interrogator or the like), speed, excess speed, and the like. At a later date, in accordance with the data, a notification of speeding can be sent to a possessor of the wheeled vehicle.

Information that is held in the RFID tag is not limited to information on date and time and speed information. For example, the RFID tag may hold information on a place of excess speed or the like in addition to the above information. Further, in terms of making management of a plurality of interrogators by the server computer easy, each interrogator preferably has unique ID.

Details of operation of a server computer that can be used in this embodiment mode are shown in FIG. 1C. In this embodiment mode, the server computer is uniformly used; however, it is not particularly limited as long as it is an information processing unit. For example, a computer connected to a lower part of the server computer, or another structure may be used. Furthermore, details of the sever computer shown in FIG. 1C is just one example, and it is not limited to this.

A signal including vehicle ID that is sent from the first interrogator 106 is inputted to a signal processing unit 120 of the server computer 110. The signal inputted to the signal processing unit 120 is converted to data suitable for arithmetic processing, and then the signal is inputted to a storage unit 124 through an arithmetic unit 122 and held. At this time, information on date and time is stored simultaneously with vehicle ID. The information on date and time may be measured by the first interrogator 106 or may be information at the time where the vehicle ID is inputted to the storage unit 124 of the server computer. Subsequently, a signal including vehicle ID that is sent from the second interrogator 108 is inputted to the storage unit 124 and held through the similar process as with the case of the first interrogator 106.

Then, the arithmetic unit 122 extracts a pair of information on date and time with the same vehicle IDs, and a difference thereof is calculated. In other words, time period that is needed for the wheeled vehicle 104 driven from the point A where the first interrogator 106 is placed to the point B where the second interrogator 108 is placed is calculated. After that, average speed is determined with the use of the distance between the point A and the point B that is held in the storage unit 124 in advance. In a case where the average speed exceeds legal speed of a region including the point A and the point B, the excess average speed and vehicle ID are inputted together to the storage unit 124 and held. Then, excess of legal speed is notified as appropriate with the use of an external output unit 126 or the like.

Figure 2:
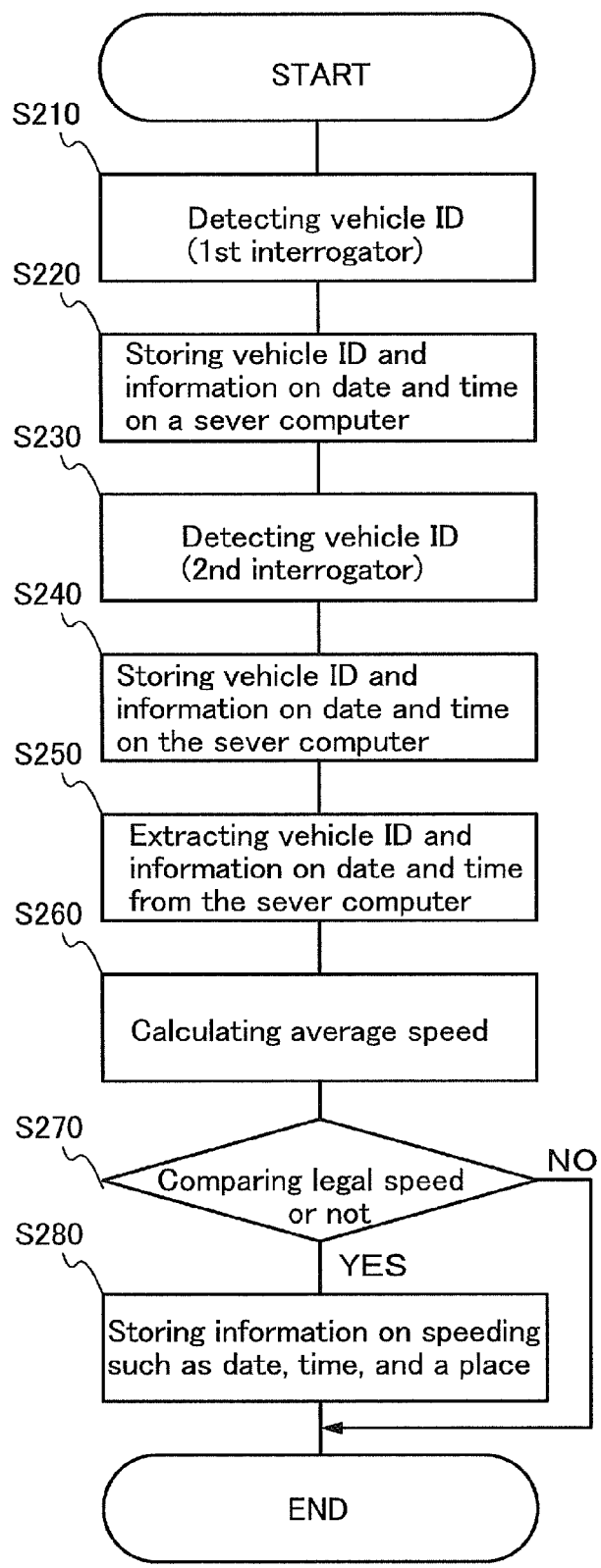
FIG. 2 is a flow chart showing a flow of calculating speed of the present invention.

FIG. 2 shows a flow chart for calculating speed of the wheeled vehicle described in the above.

As a step S210, the first interrogator detects vehicle ID of the wheeled vehicle that approaches or passes through the first interrogator. As a step S220, the vehicle ID and information on date and time are stored on the sever computer.

As a step S230, the second interrogator detects vehicle ID of a wheeled vehicle that approaches or passes through the second interrogator. As a step S240, the vehicle ID and information on date and time are stored on the server computer.

After the step S240, as a step S250, the server computer extracts a pair of information on date and time with the same vehicle IDs. It is to be noted that the step S250 may be conducted simultaneously with the step S240. In this case, information on vehicle ID that corresponds to the vehicle ID detected by the step S230 (information stored by the step S220) is extracted, and speed is calculated in the subsequent step.

Next, as a step S260, the sever computer calculates time period that is needed for the driving between the first interrogator and the second interrogator from the extracted information on date and time, and calculates average speed with the use of the distance between the first interrogator and the second interrogator.

In the subsequent step S270, the calculated average speed and legal speed are compared, and it is examined that whether the calculated average speed is speeding or not. When the average speed is determined as the speeding here (in a case of YES in FIG. 2), as a step S280, information on speeding such as date and time, a place (including unique ID assigned to the interrogator or the like), speed, and excess of speed are stored on the sever computer. To the contrary, when the average speed is not speeding, the flow is completed without storing information on speeding.

In the present invention, whether the above process is conducted by a software or hardware is not particularly limited.

Figure 3A:
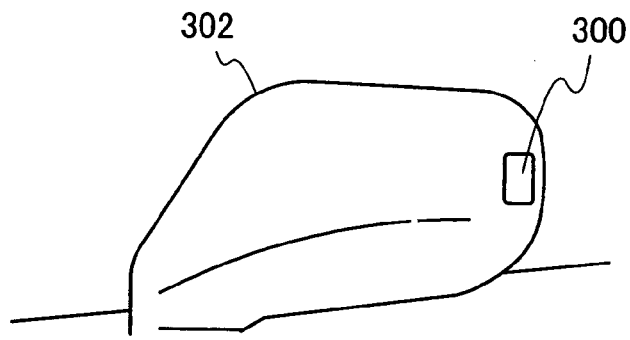
FIGS. 3A to 3C are views each illustrating an example of setting an RFID tag on a wheeled vehicle of the present invention.
Figure 3B:
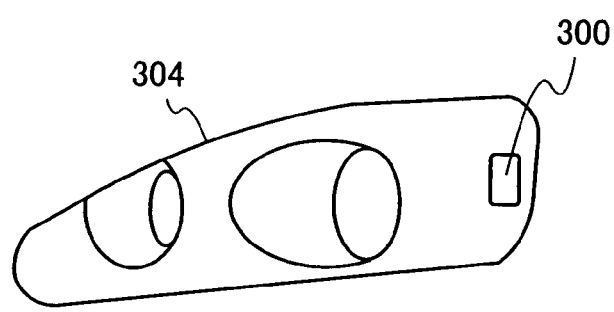
Figure 3C:
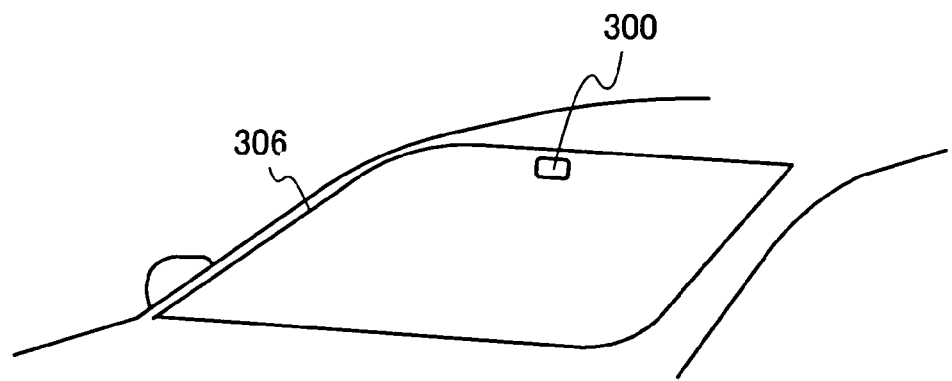

In FIGS. 3A to 3C, examples of setting an RFID tag on wheeled vehicles are shown.

FIG. 3A shows an example of setting an RFID tag 300 of the present invention on a side mirror 302 of a wheeled vehicle. When the RFID tag 300 is set to be in contact with a portion having conductivity such as metal, defects may be generated in communication. Therefore, it is preferable to avoid the RFID tag 300 to be set at a portion having conductivity. The side mirror 302 shown in FIG. 3A is formed from a resin material in many cases, and it is favorable for a setting portion of the RFID tag 300.

Although FIG. 3A shows a structure where the RFID tag 300 is attached to a surface of the side mirror 302, the RFID tag 300 may be embedded in the side mirror 302. Alternatively, the RFID tag 300 may be attached to a mirror part included in the side mirror 302 or may be embedded in the mirror part thereof.

FIG. 3B shows an example of setting the RFID tag 300 of the present invention on a headlight 304 of a wheeled vehicle. The headlight 304 is formed from glass, a resin, or the like in many case, and it is favorable for a setting portion of the RFID tag 300.

Although FIG. 3B shows a structure where the RFID tag 300 is attached to a surface of the headlight 304, the RFID tag 300 may be embedded in the headlight 304. Alternatively, the RFID tag 300 may be set in a space inside of the headlight 304.

Naturally, the setting portion of the RFID tag of the present invention is not limited to the headlight. The RFID tag may be attached to a blinker or another light or may be embedded therein.

FIG. 3C shows an example of setting the RFID tag 300 of the present invention on a windshield 306 of a wheeled vehicle. The windshield 306 is formed from glass or the like, and it is favorable for a setting portion of the RFID tag 300.

Although FIG. 3C shows a structure where the RFID tag 300 is attached to a surface of the windshield 306, the RFID tag 300 may be embedded in the windshield 306. Alternatively, the setting place of the present invention is not limited to the windshield, and the RFID tag 300 may be attached to a rear windshield or another window or may be embedded therein.

It is to be noted that FIGS. 3A to 3C are just one example, and the RFID tag may be in any position as long as the function of the present invention can be secured. For example, the RFID tag may be attached to a portion that is formed from a resin material inside the wheeled vehicle or may be embedded therein. In a case where a serious problem is not caused even when the RFID tag 300 is set at a portion having conductivity, the RFID tag 300 may be set at a portion having conductivity. Further, it is not limited to one RFID tag that is set on one wheeled vehicle, and two or more RFID tags may be set on one wheeled vehicle. By providing a plurality of RFID tags, redundancy to breakdown of the RFID tag or the like can be generated.

FIGS. 4A to 4D show examples of setting a interrogator of the present invention. FIG. 4A to 4D are views for showing placement of a interrogator; therefore, an RFID tag set on a wheeled vehicle is not shown.

Figure 4A:
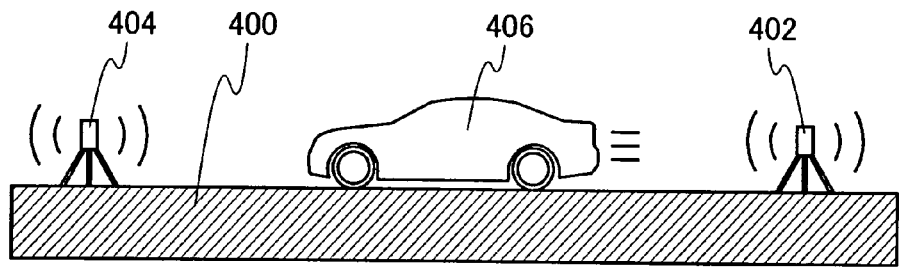
FIGS. 4A to 4D are views each illustrating an example of placing a interrogator of the present invention.

FIG. 4A shows an example in which a interrogator 402 and a interrogator 404 are placed on a road 400 and speed of a wheeled vehicle 406 is measured. As the placement example of the interrogator shown in FIG. 4A, for example, simplified speed check equipment can be given. Since the interrogator is relatively small in size and is easily carried, it can be placed in a short time period. Therefore, in a case where crackdown is temporarily strengthened, it is extremely effective to use the setting example as shown in FIG. 4A. In FIG. 4A, an example in which a tripod is used as a placement method of the interrogator; however, it is not limited thereto. The interrogator may be directly placed on a road.

Figure 4B:
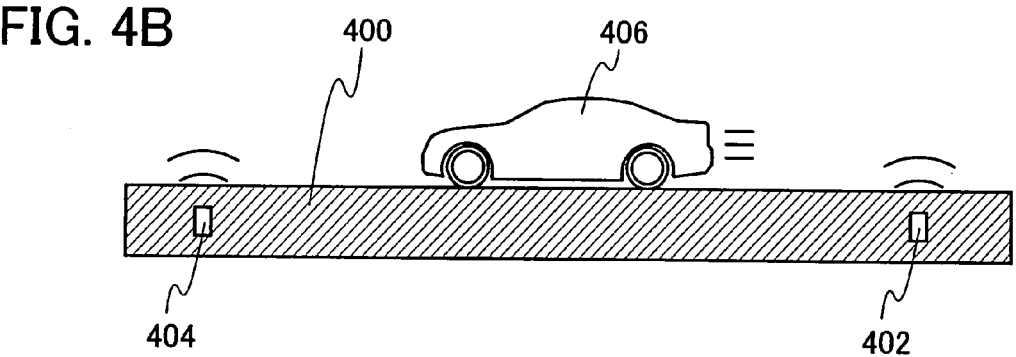

FIG. 4B shows an example in which the interrogator 402 and the interrogator 404 are placed in the ground of the road 400 and speed of the wheeled vehicle 406 is measured. The example of FIG. 4B can use for example, fixed-type speed check equipment. In a case of using the placement example shown in FIG. 4B, an RFID tag is preferably set in the vicinity of a lower part (bottom) of the wheeled vehicle 406. However, the setting position of the RFID tag is not limited to the vicinity of a lower part (bottom) as long as a problem is not caused in measuring speed.

Figure 4C:
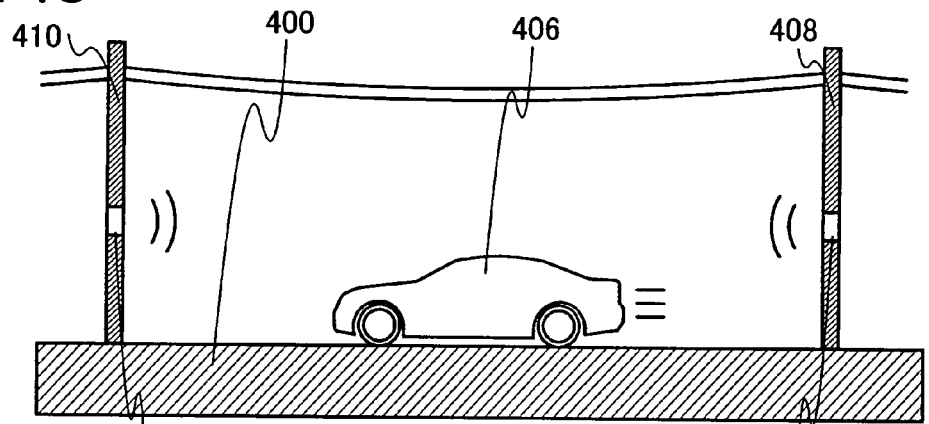

FIG. 4C shows an example in which the interrogator 402 and the interrogator 404 are set on a telephone pole (in FIG. 4C, a telephone pole 408 and a telephone pole 410) or the like placed at the side of the road 400, and speed of the wheeled vehicle 406 is measured. The example of FIG. 4C can use for example, fixed-type speed check equipment. In a case of using the setting example shown in FIG. 4C, an RFID tag is preferably set on a side portion or in the vicinity of a top portion of the wheeled vehicle 406. However, the setting position of the RFID tag is not limited to a side portion or the vicinity of a top position as long as a problem is not caused in measuring speed.

Figure 4D:
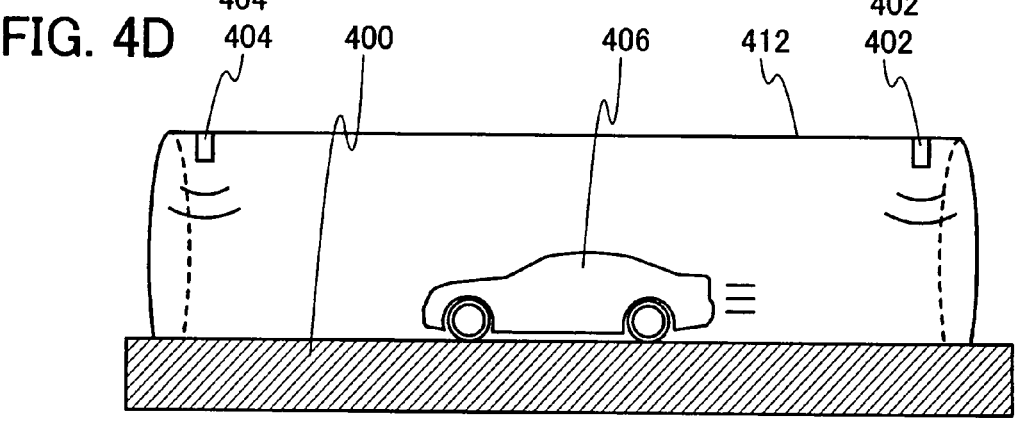

FIG. 4D shows an example in which the interrogator 402 and the interrogator 404 are placed in a tunnel 412, and speed of the wheeled vehicle 406 driven on the road 400 is measured. The example of FIG. 4D can use for example, fixed-type speed check equipment. In a case of using the placement example shown in FIG. 4D, an RFID tag is preferably set in the vicinity of a top portion of the wheeled vehicle 406. However, the setting position of the RFID tag is not limited to the vicinity of a top position as long as a problem is not caused in measuring speed.

In FIGS. 5A to 5E, the placement examples of the interrogator are shown as plan views. It is to be noted that the RFID tag mounted on the wheeled vehicle is not illustrated for simplicity.

Figure 5A:
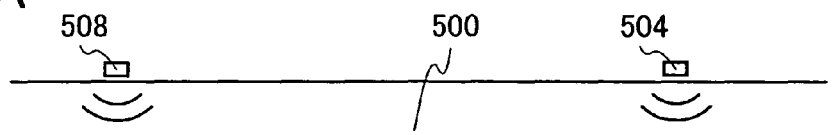
FIGS. 5A to 5E are views each illustrating an example of placing a interrogator of the present invention.

FIG. 5A shows an example in which a interrogator 504, a interrogator 506, a interrogator 508, and a interrogator 510 are placed in order to measure speed of a wheeled vehicle 502 driven on a road 500. As the placement example shown in FIG. 5A, for example, simplified speed check equipment can be given. Since the interrogator is relatively small in size and is easily carried, it can be set in a short time period. Therefore, in a case where crackdown is temporarily strengthened, it is extremely effective to use the placement example shown in FIG. 5A. Naturally, the placement of FIG. 5A can be used for fixed-type speed check equipment.

In FIG. 5A, the interrogators are placed on each of a lane where the wheeled vehicle 502 is driven and an opposite lane. By such a structure, speed can be measured with high accuracy regardless of the lane where the wheeled vehicle is driven. The number of interrogators may be increased or decreased as appropriate depending on the number of lanes, width of a road, and the like. In a case of measuring speed of the wheeled vehicle 502 of FIG. 5A, the interrogator 506 functions as a first interrogator, and the interrogator 510 functions as a second interrogator because the traveling direction of the wheeled vehicle 502 is in the right direction in the drawing. However, it is not limited thereto.

Figure 5B:
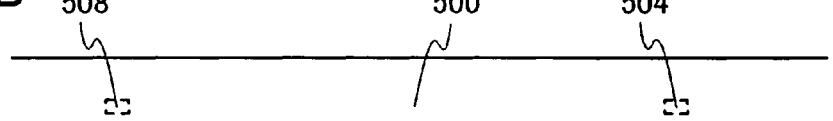

FIG. 5B shows an example in which the interrogator 504, the interrogator 506, the interrogator 508, and the interrogator 510 are placed in the ground of the road 500. The example of FIG. 5B can use fixed-type speed check equipment. In FIG. 5B, the interrogators are each placed on a lane where the wheeled vehicle 502 is driven and an opposite lane, as similar to FIG. 5A. By such a structure, speed can be measured with high accuracy regardless of the lane where the wheeled vehicle is driven. The number of interrogators may be increased or decreased as appropriate depending on the number of lanes, width of the road, and the like.

In a case of using the placement example shown in FIG. 5B, an RFID tag is preferably set in the vicinity of a lower part (bottom) of the wheeled vehicle 502. However, in a case of a setting position where problems are not caused in measuring speed, the position of the RFID tag is not limited to the vicinity of the lower part (bottom).

Figure 5C:
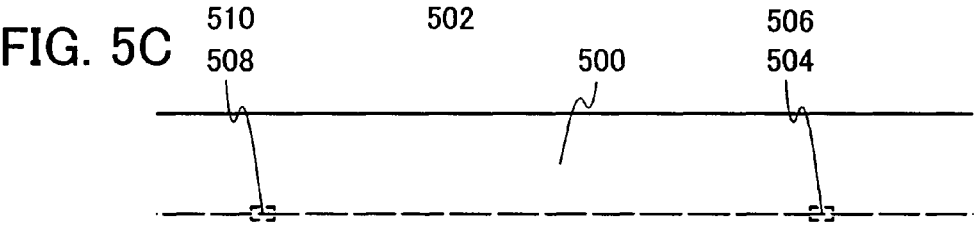

FIG. 5C shows an example in which the interrogator 504 and the interrogator 508 are placed in the ground of the center part of the road 500. By such a structure, speed can be measured with high accuracy regardless of the lane where the wheeled vehicle is driven while the placement number of interrogators is suppressed. However, in a case where the width of the road 500 drastically exceeds a communication distance, the structure shown in FIG. 5B is preferably used. The example of FIG. 5C can use for example, fixed-type speed check equipment. In a case of using the placement example shown in FIG. 5C, an RFID tag is preferably set in the vicinity of a lower part (bottom) of the wheeled vehicle 502. However, in a case of a setting position where problems are not caused in measuring speed, the position of the RFID tag is not limited to the vicinity of the lower part (bottom).

Figure 5D:
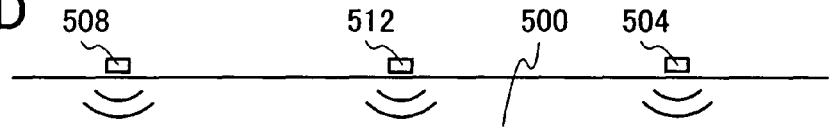

FIG. 5D shows an example in which a interrogator 512 and a interrogator 514 are added to the structure of FIG. 5A. By such a structure, average speed of three sections can be determined. The three sections are a section between the interrogator 504 (506) and the interrogator 512 (514), a section between the interrogator 504 (506) and the interrogator 508 (510), and a section between the interrogator 512 (514) and the interrogator 508 (510).

By such a structure, transition of the average speed can be examined, and for example, dangerous driving such as rapid acceleration or deceleration can be detected. In addition to the structure of FIG. 5D, by placing a large number of interrogators, approximate instantaneous speed can be measured. Further, the instantaneous speed is measured at a plurality of points, whereby acceleration can be determined.

Figure 5E:
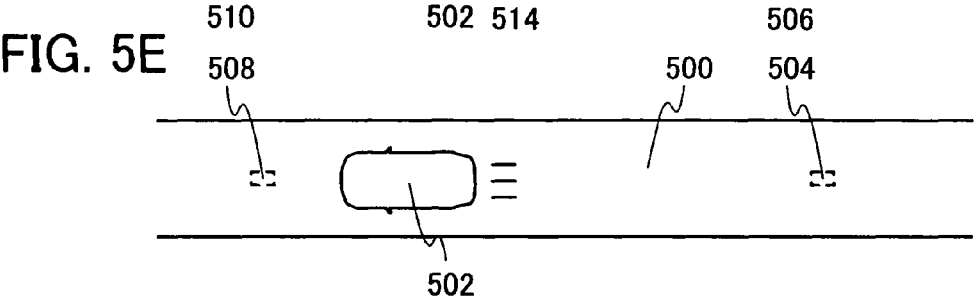

FIG. 5E shows an example in which interrogators are placed on the road of one lane. In FIG. 5E, the interrogator 504 and the interrogator 508 are placed in the ground of the central portion of the road 500, as similar to FIG. 5C. On a road of one lane as shown in FIG. 5E, the traveling direction of wheeled vehicles is not constant. Accordingly, either interrogator corresponds to the first interrogator or the second reader/wrier is determined depending on the traveling direction of the wheeled vehicles. For example, in a case where the wheeled vehicle travels in the left direction in the drawing, the interrogator 504 functions as the first interrogator and the interrogator 508 functions as the second interrogator. Alternatively, the wheeled vehicle travels in the right direction in the drawing, the interrogator 508 functions as the first interrogator and the interrogator 504 functions as the second interrogator.

Information on date and time that is held in the server computer when the wheeled vehicle passes through the interrogator determines which interrogator corresponds to the first interrogator or the second interrogator. In other words, by comparing each information on date and time of a pair of the interrogator 504 and the interrogator 508, the interrogator which holds information on earlier time is the first interrogator, and the interrogator which holds information on later time is the second interrogator.

As described above, the concept of the first interrogator and the second interrogator is one of convenience. In actual calculating speed, speed can be calculated by comparing information on date and time with the same vehicle IDs without specifically determining the first interrogator and the second interrogator.

By such a structure, speed can be measured with high accuracy even on a road of one lane. The setting example of FIG. 5E can use for example, fixed-type speed check equipment. In a case of using the placement example shown in FIG. 5E, an RFID tag is preferably set in the vicinity of a lower part (bottom) of the wheeled vehicle 502. However, in a case of a setting position where problems are not caused in measuring speed, the position of the RFID tag is not limited to the vicinity of the lower part (bottom). Further, on a road of one lane, the structure such as FIG. 5A or FIG. 5D can be used.

The placement examples of FIGS. 4A to 4D and FIGS. 5A to 5E are just one example, and any placement may be employed as long as the function of the present invention can be secured.

Manufacturing steps of an RFID tag that can be used in the present invention are described with reference to FIGS. 6A to 8B. Although, in this embodiment mode, an example of forming an RFID tag over the glass substrate is shown, it is not limited thereto. An RFID tag may be formed using a silicon substrate.

Figure 6A:
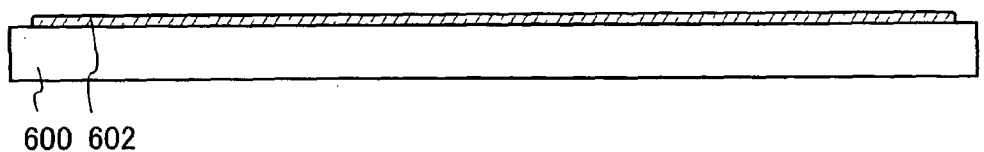
FIGS. 6A to 6E are views illustrating a process for manufacturing an RFID tag of the present invention.

First, a peeling layer 602 is formed over a surface of a substrate 600 (see FIG. 6A). As the substrate 600, one in which an insulating layer is formed over a surface of a glass substrate, a quartz substrate, a metal substrate, or a stainless substrate, a plastic substrate having heat resistance capable of resisting processing temperature of these steps, or the like can be used. Since the substrate 600 as the above has no limitation on the size and shape, for example, it is possible to use a rectangular substrate of which one side is one meter or more. By using such a large-sized rectangular substrate, productivity can be drastically improved. This is the large advantage in comparison with the case of manufacturing an RFID tag from a circular silicon substrate.

A thin film integrated circuit formed over the substrate 600 is peeled from the substrate 600 in the subsequent steps. That is, the RFID tag manufactured in this embodiment mode does not include the substrate 600. Accordingly, the substrate 600 from which the thin film integrated circuit is peeled can be reused. In this manner, when the substrate 600 is reused, even if an expensive quartz substrate is used, cost can be reduced, which is preferable.

In this embodiment mode, after a thin film is formed over the surface of the substrate 600, the shape thereof is processed using a photolithography method, so that the peeling layer 602 is selectively formed.

The peeling layer 602 is formed to have a single layer or a stacked layer, which is formed from an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), lead (Pb), osmium (Os), iridium (Ir), or silicon (Si), or an alloy material or a compound material containing the element as its main component. A layer containing silicon may be amorphous, microcrystal, or polycrystal.

When the peeling layer 602 has a single layer structure, it is preferable to form a tungsten layer, a molybdenum layer, or a layer containing a mixture of tungsten or molybdenum. Alternatively, it is preferable to form a layer containing an oxide or oxynitride of tungsten, a layer containing an oxide or oxynitride of molybdenum, or a layer containing an oxide or oxynitride of a mixture of tungsten and molybdenum. The mixture of tungsten and molybdenum corresponds to an alloy of tungsten and molybdenum, for example. In addition, the oxide of tungsten is also referred to as tungsten oxide.

When the peeling layer 602 is a stacked layer structure, a tungsten layer, a molybdenum layer or a layer containing a mixture of tungsten and molybdenum is preferably formed as a first layer of the peeling layer 602. Then, as a second layer, an oxide, nitride, oxynitride, or nitride oxide of tungsten, molybdenum or a mixture of tungsten and molybdenum is preferably formed.

When a stacked layer structure of a layer containing tungsten and a layer containing oxide of tungsten is formed as the peeling layer 602, the following method may be employed: the layer containing tungsten is formed and then a layer containing silicon oxide is formed thereover so that the layer containing the oxide of tungsten is formed at an interface between the tungsten layer and the layer containing silicon oxide. This method can be applied to the cases of forming layers containing nitride, oxynitride, and nitride oxide of tungsten, and after forming the layer containing tungsten, a silicon nitride layer, a silicon oxynitride layer, or a silicon nitride oxide layer is formed thereover. It is to be noted that a silicon oxide layer, a silicon oxynitride layer, a silicon nitride oxide layer, or the like formed over the layer containing tungsten later functions as an insulating layer to become a base later.

In forming the oxide of tungsten, the composition thereof is not particularly limited, and it may be determined based on etching rate or the like. The composition having the most favorable etching rate is a layer containing oxide of tungsten formed by a sputtering method under the oxide atmosphere. Accordingly, in order to shorten the manufacturing time, a layer containing oxide of tungsten is preferably formed as the peeling layer by a sputtering method under the oxide atmosphere.

Although, in the above step, the peeling layer 602 is formed to be in contact with the substrate 600, it is not limited to this step. The insulating layer to be a base may be formed to be in contact with the substrate 600, and the peeling layer 602 may be formed to be in contact with the insulating layer.

Figure 6B:
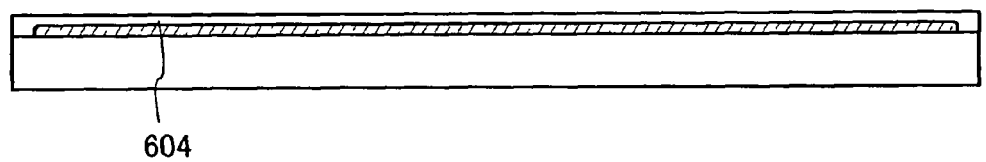
Figure 6C:
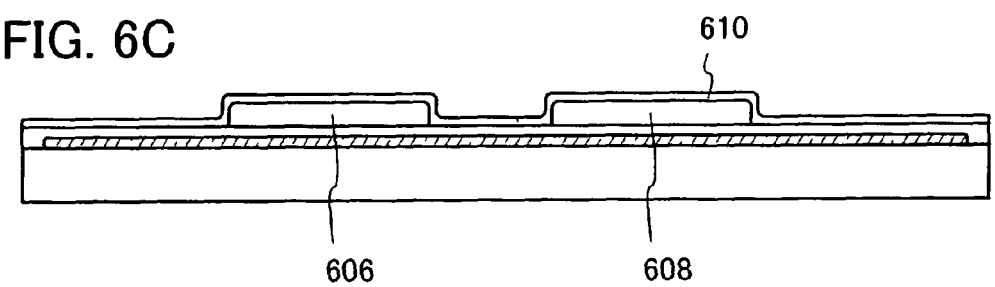

Next, an insulating film 604 to be a base is formed to cover the peeling layer 602 (see FIG. 6B). As the insulating film 604 to be a base, a layer containing oxide of silicon or nitride of silicon is formed to have a single layer or a stacked layer by a sputtering method, a plasma CVD method, or the like. The silicon oxide material is a substance containing silicon (Si) and oxygen (O), which corresponds to silicon oxide, silicon oxynitride, silicon nitride oxide, or the like. The silicon nitride material is a substance containing silicon and nitrogen (N), which corresponds to silicon nitride, silicon oxynitride, silicon nitride oxide, or the like.

Next, a semiconductor film is formed over the insulating film 604 (not shown in the figure). As the semiconductor film, an amorphous semiconductor film may be formed. Alternatively, a microcrystal semiconductor film or a crystalline semiconductor film may be formed. Although a material of the semiconductor film is not limited, silicon or silicon germanium (SiGe) is preferably used. In this embodiment mode, an amorphous silicon film having a film thickness of about greater than or equal to 25 nm and less than or equal to 100 nm (preferably, greater than or equal to 30 nm and less than or equal to 60 nm) is formed. After the semiconductor film is formed, a step for removing hydrogen contained in the semiconductor film may be performed. Specifically, the semiconductor film may be heated at 500° C. for one hour.

Subsequently, an element for promoting crystallization is added to the semiconductor film. In this embodiment mode, a solution containing nickel (Ni) of greater than or equal to 10 ppm and less than or equal to 100 ppm in weight conversion, for example, a nickel acetate solution is applied to a surface of the semiconductor film using a spin coating method. A method for adding an element for promoting crystallization is not limited to the above, and addition may be performed using a sputtering method, an evaporation method, plasma treatment, or the like.

Then, heat treatment is performed at higher than or equal to 500° C. and lower than or equal to 650° C. for greater than or equal to 4 hours and less than or equal to 24 hours, for example, at 570° C. for 14 hours. By this heat treatment, a semiconductor film in which crystallization is promoted is formed.

As heating treatment, RTA (Rapid Thermal Anneal) using radiation of a lamp as a heat source or RTA using heated gas (gas RTA) can be cited. Alternatively, heating treatment using an annealing furnace, heating treatment by irradiation with a laser beam, or combination thereof may be performed.

In a case of irradiation with a laser beam, continuous-wave (CW) laser beam or a pulsed wave laser beam (pulsed laser beam) can be used. Here, a beam emitted from a gas laser such as an Ar laser, a Kr laser, or an excimer laser; a laser using, as a medium, single crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ doped with one or more of Nd, Yb, Cr, Ti, Ho, Er, Tm, and Ta as a dopant; a glass laser; a ruby laser; an alexandrite laser; a Ti: sapphire laser; a copper vapor laser; or a gold vapor laser, can be used as the laser beam. By irradiation with a laser beam having a fundamental wave of such lasers or one of the second to fourth harmonics of these fundamental waves, a crystal with a large grain size can be obtained. For example, the second harmonic (532 nm) or the third harmonic (355 nm) of an Nd:YVO$_4$ laser (fundamental wave of 1064 nm) can be used. This laser can be emitted by either CW or pulsed oscillation.

It is to be noted that each laser using, as a medium, single crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ doped with one or more of Nd, Yb, Cr, Ti, Ho, Er, Tm, and Ta as a dopant; an Ar ion laser; and a Ti: sapphire laser, is capable of continuous oscillation. Further, pulse oscillation thereof can be performed at a repetition rate of 10 MHz or more by carrying out Q switch operation or mode synchronization. When a laser beam is emitted at a repetition rate of 10 MHz or more, a semiconductor film is irradiated with a next pulse while the semiconductor film is melted by the laser beam and then solidified. Therefore, unlike the case of using a pulsed laser with a low repetition rate, a solid-liquid interface can be continuously moved in the semiconductor film so that crystal grains, which continuously grow in a scanning direction, can be obtained.

In this embodiment mode, nickel (Ni) is used as the element for promoting crystallization of a semiconductor film. Instead of nickel, an element such as germanium (Ge), iron (Fe), palladium (Pd), tin (Sn), lead (Pb), cobalt (Co), platinum (Pt), copper (Cu), or gold (Au) may be used.

In accordance with the above step, a crystalline semiconductor film is formed. It is to be noted that an element for promoting crystallization is included in the crystalline semiconductor film. Therefore, after the crystallization step, gettering of the element is preferably performed.

Next, the crystalline semiconductor film is etched to form an island-shaped semiconductor film 606 and an island-shaped semiconductor film 608. Then, a gate insulating film 610 is formed to cover the island-shaped semiconductor film 606 and the island-shaped semiconductor film 608 (see FIG. 6C).

The gate insulating film 610 may have a single layer structure or a staked layer structure as long as it is an insulating film containing at least oxygen or nitride. As a formation method, a plasma CVD method or a sputtering method can be used. In this embodiment mode, silicon nitride oxide (SiN$_x$O$_y$ (x>y)) and silicon oxynitride (SiO$_x$N$_y$ (x>y)) are continuously formed to have a total thickness of 115 nm. In a case where a TFT having a channel length of 1 m or less (also referred to as a submicron TFT) is formed, the gate insulating film is preferably formed to have a thickness of 10 to 50 nm.

Figure 6D:
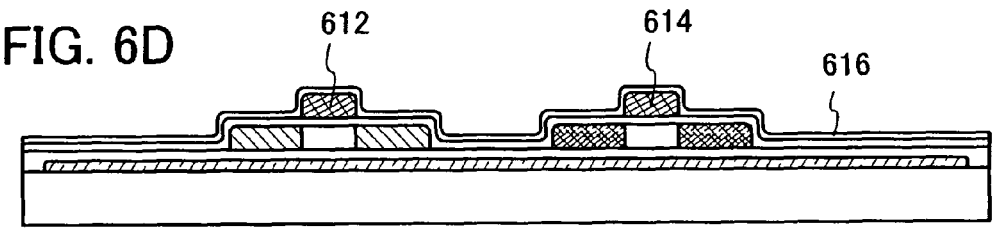

Next, a conductive film is formed over the gate insulating film 610 and etched to form a gate electrode 612 and a gate electrode 614 (see FIG. 6D). As the gate electrode 612 and the gate electrode 614, for example, a conductive film in which W (tungsten) and tantalum nitride are stacked, a conductive film in which Mo (molybdenum), Al (aluminum), Mo are stacked in this order, or a conductive film in which Ti (titanium), Al, Ti are stacked in this order can be used. In this embodiment mode, a stacked film of W (tungsten) and tantalum nitride is used. Alternatively, an element selected from gold (Au), silver (Ag), copper (Cu), platinum (Pt), aluminum (Al), chromium (Cr), palladium (Pd), indium (In), molybdenum (Mo), nickel (Ni), lead (Pb), iridium (Ir), rhodium (Rh), tungsten (W), cadmium (Cd), zinc (Zn), iron (Fe), titanium (Ti), zirconium (Zr), or barium (Ba), or an alloy material or a compound material containing the element as its main component can be used as a single layer or a stacked layer.

As another method, the gate electrode 612 and the gate electrode 614 may be formed using a droplet discharging method typified or an inkjet method by a printing method by which a material can be discharged at a predetermined portion.

An impurity imparting n-type or p-type conductivity is selectively added to the island-shaped semiconductor film 606 and the island-shaped semiconductor film 608 using a resist (not shown) as a mask, which is used in forming the gate electrode 612 and the gate electrode 614 (see FIG. 6D). As a result, a source region, a drain region, a channel formation region, and the like are formed.

Subsequently, an insulating film 616 is formed (see FIG. 6D). The insulating film 616 is formed of a silicon nitride film or a silicon nitride oxide film to have a single layer structure or a stacked layer structure with a thickness of 100 to 200 nm by a plasma CVD method or a sputtering method. In a case of combining a silicon nitride oxide film or a silicon oxynitride film, film formation can be continuously performed by switching gas. In this embodiment mode, a silicon oxynitride film with a thickness of 100 nm is formed by a plasma CVD method. By providing the insulating film 616, various impurities such as oxygen and moisture in the air can be prevented from penetration into the island-shaped semiconductor film 606 and the island-shaped semiconductor film 608.

Figure 6E:
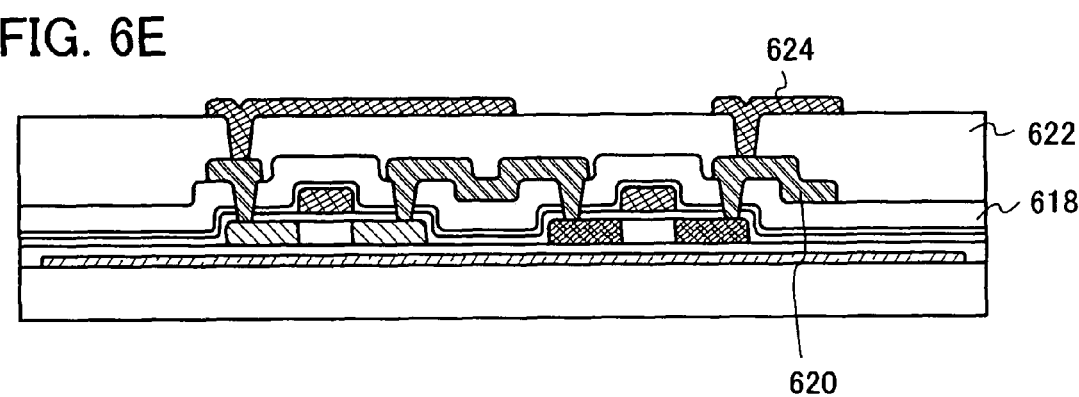

Next, an insulating film 618 is formed (see FIG. 6E). Here, an organic resin film such as polyimide, polyamide, BCB (benzocyclobutene), acrylic, or siloxane; an inorganic interlayer insulating film (insulating film containing silicon such as silicon nitride or silicon oxide); a low-k (low dielectric constant) material; or the like, with which the insulating film 616 is coated by a SOG (Spin On Glass) method or a spin coating method can be used. Alternatively, an oxazole resin, for example, photosensitive polybenzoxazole can be used. The photosensitive polybenzoxazole has a low dielectric constant (a dielectric constant of 2.9 at 1 MHz at a room temperature), high heat resistance (a thermal decomposition temperature of 550° C. with the rise in a temperature of 5° C./min, which is measured by thermogravimetric analyzer (TGA)), and a low water absorption rate (0.3% at a room temperature in 24 hours). An oxazole resin which has a lower dielectric constant as compared to polyimide is suitable as the insulating film 618.

Subsequently, the gate insulating film 610, the insulating film 616, and the insulating film 618 are patterned by a photolithography method to form contact holes that reach a source region and a drain region (see FIG. 6E).

Then, a conductive film is formed using a conductive material, and this conductive material is patterned, so that a wiring 620 is formed. After that, an insulating film 622 is formed, and contact holes that reach the wiring 620 are formed (see FIG. 6E).

After the contact holes are formed, an antenna 624 is formed to cover the contact holes and the insulating film 622. The antenna 624 can be formed by patterning after a conductive film that is to be the antenna is formed over the insulating film 622. The antenna may be formed by a droplet discharging method typified by a printing method or an inkjet method (see FIG. 6E).

It is to be noted that a structure of a thin film transistor shown in this embodiment mode is not limited to the above structure. For example, a lightly doped drain (LDD) region may be provided, or a sidewall may be formed on the side surface of each of the gate electrode 612 and the gate electrode 614. Although a thin film transistor having a single gate structure is formed in this embodiment mode, a multi-gate structure may be formed. A bottom gate structure may also be formed, and a dual gate structure in which two gate electrodes are disposed over and below a channel region with a gate insulating film interposed therebetween may be formed.

The antenna 624 is formed from an element selected from gold (Au), silver (Ag), copper (Cu), platinum (Pt), aluminum (Al), chromium (Cr), palladium (Pd), indium (In), molybdenum (Mo), nickel (Ni), lead (Pb), iridium (Ir), rhodium (Rh), tungsten (W), cadmium (Cd), zinc (Zn), iron (Fe), titanium (Ti), zirconium (Zr), or barium (Ba), or an alloy material or a compound material containing the element as its main component. The antenna 624 may have a singe layer structure or a stacked layer structure. For example, a stacked structure of a barrier layer and an aluminum layer, a stacked layer structure of a barrier layer, an aluminum layer, and a barrier layer, or the like can be employed. The barrier layer corresponds to titanium, nitride of titanium, molybdenum, nitride of molybdenum or the like. As a shape of the antenna 624, dipole, circle (a loop antenna, for example), flat rectangular solid (a patch antenna, for example), or the like can be cited.

Figure 7A:
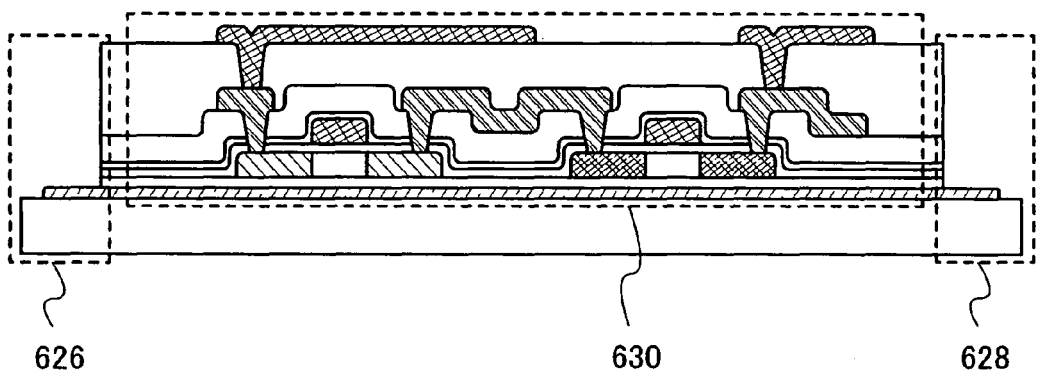
FIGS. 7A to 7D are views illustrating a process for manufacturing an RFID tag of the present invention.

Next, the insulating film 604, the gate insulating film 610, the insulating film 616, the insulating film 618, and the insulating film 622 are etched by a photolithography method so as to expose the peeling layer 602, so that an opening 626 and an opening 628 are formed (see FIG. 7A).

After that, an insulating layer 632 is formed (see FIG. 7B) by an SOG method, a droplet discharging method, or the like so as to cover a thin film integrated circuit 630 (see FIG. 7A). The insulating layer 632 is formed from an organic material, preferably, formed from an epoxy resin. The thin film integrated circuit 630 is small, thin, and lightweight, and it is not adhered to the substrate; therefore, it is easily scattered after the peeling layer is removed. However, by forming the insulating layer 632 around the thin film integrated circuit 630, the thin film integrated circuit 630 is weighed, and scattering from the substrate 600 can be prevented. Further, the thin film integrated circuit 630 itself is thin and weak; however, by forming the insulating layer 632, uniform intensity can be secured.

Figure 7B:
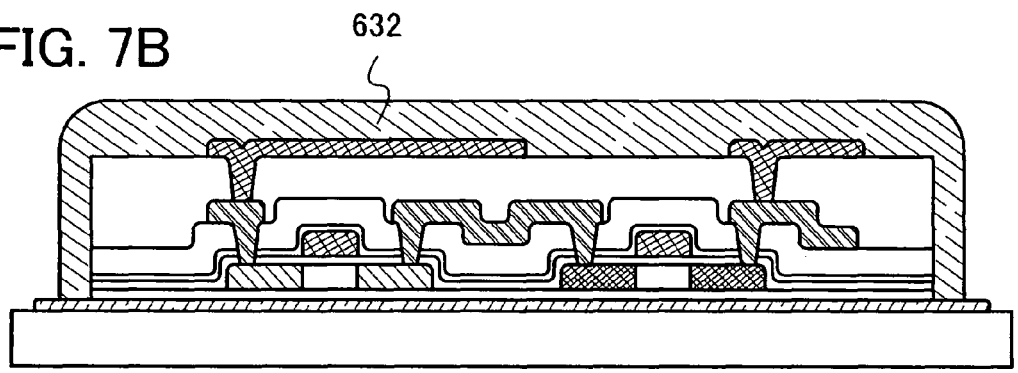

Although the insulating layer 632 is formed on a top face and side faces of the thin film integrated circuit 630 in the structure of FIG. 7B, it is not limited to this structure. The insulating layer 632 may be formed only on the top face of the thin film integrated circuit 630. Although the step for forming the insulating layer 632 is performed after the step for forming an opening 626 and an opening 628 in this embodiment mode, it is not limited to this order. After the step for forming an insulating layer 632 over the insulating film 622 and the antenna 624, a plurality of the insulating layers may be etched to form an opening. In this structure, the insulating layer 632 is formed only on the top face of the thin film integrated circuit 630.

Figure 7C:
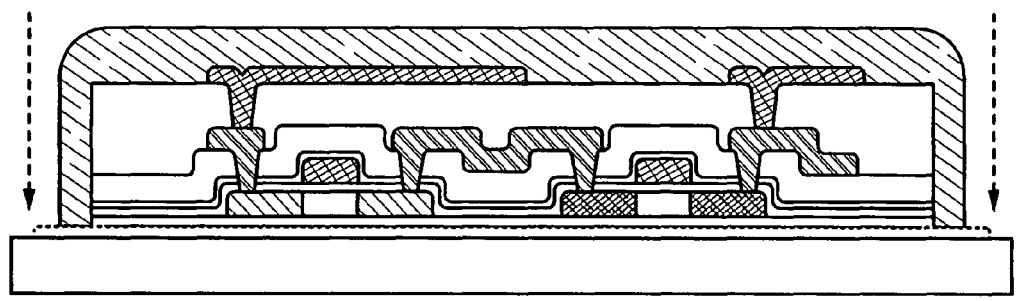

Next, the peeling layer 602 is removed by introducing an etchant into the opening 626 and the opening 628 (see FIG. 7C). As the etchant, a gas or a liquid containing halogen fluoride or an interhalogen compound is used, for example, chlorine trifluoride (ClF$_3$) is used as a gas containing halogen fluoride. Thus, the thin film integrated circuit 630 is peeled from the substrate 600.

Figure 7D:
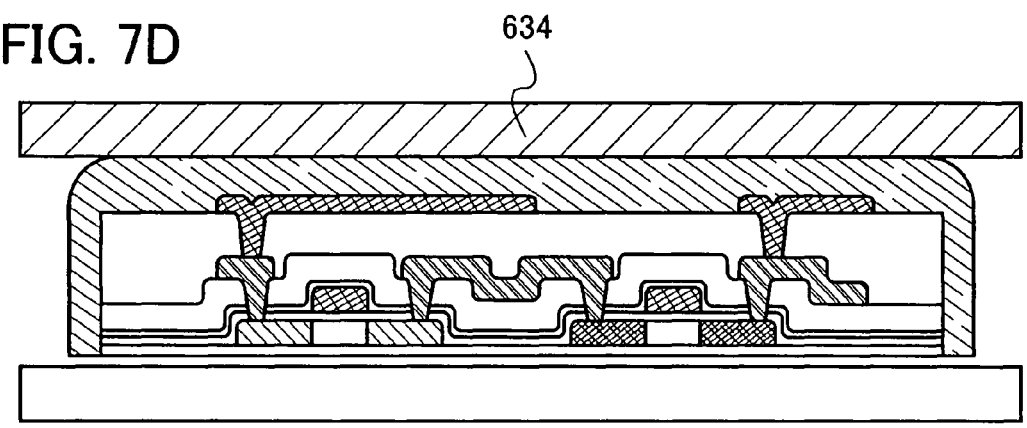

Subsequently, one of surfaces of the thin film integrated circuit 630 is attached to a first base 634, so that the thin film integrated circuit 630 is completely peeled from the substrate 600 (see FIG. 7D).

Figure 8A:
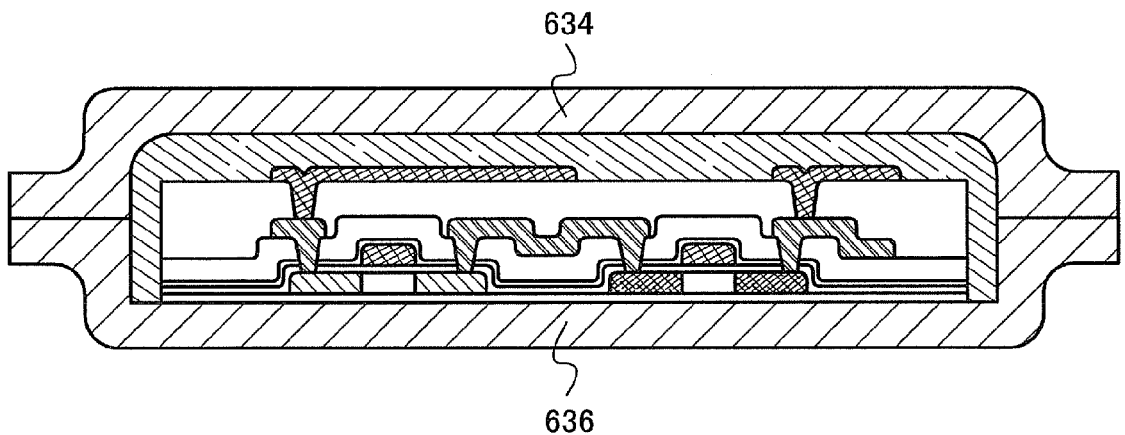
FIGS. 8A and 8B are views illustrating a process and the like for manufacturing an RFID tag of the present invention.

Then, the other surface of the thin film integrated circuit 630 is attached to a second base 636, and the first base 634 and the second base 636 are attached to each other, so that the thin film integrated circuit 630 is sealed with the first base 634 and the second base 636 (see FIG. 8A). Thus, an RFID tag in which the thin film integrated circuit 630 is sealed with the first base 634 and the second base 636 is completed.

As the first base 634 and the second base 636, the following can be used: a film to which antistatic treatment is performed (an antistatic film); a film of polypropylene, polyester, vinyl, polyvinyl fluoride, vinyl chloride or the like; paper made of a fibrous material; a stacked film of a base material film (polyester, polyamide, an inorganic deposition film, paper or the like) and an adhesive synthetic resin film (an acrylic-based synthetic resin, an epoxy-based synthetic resin or the like) or the like. As a film to which antistatic treatment is performed, a film with an antistatic material dispersed in a resin, a film with an antistatic material attached thereon, and the like can be given as examples. The film with an antistatic material attached thereon may be a film with an antistatic material attached on one of its surfaces, or a film with an antistatic material attached on each of its surfaces. As for the film with an antistatic material attached on one of its surfaces, the antistatic material may be attached to the inner surface of the film or the outer surface of the film. Furthermore, the antistatic material may be attached to the entire surface of the film, or to part of the film. As the antistatic material, a metal such as aluminum, an indium tin oxide (ITO), amphoteric metal salt surfactant, imidazoline type amphoteric surfactant, a resin material containing crosslinkable copolymer having a carboxyl group and a quaternary ammonium base on its side chain, and the like can be given as examples. By using antistatic films as the first base 634 and the second base 636, static electricity from outside can be prevented from having adverse effects on the integrated circuit. The stacked film can be attached to the treatment object by thermo compression bonding.

An adhesive layer may be provided over each surface of the first base 634 and the second base 636, or not. Here, the adhesive layer corresponds to a layer formed from a material containing adhesive such as heat-curable resin, ultraviolet curable resin, epoxy resin based adhesive, or resin additive.

Next, an RFID tag capable of sending and receiving data without a wire will be described.

Figure 8B:
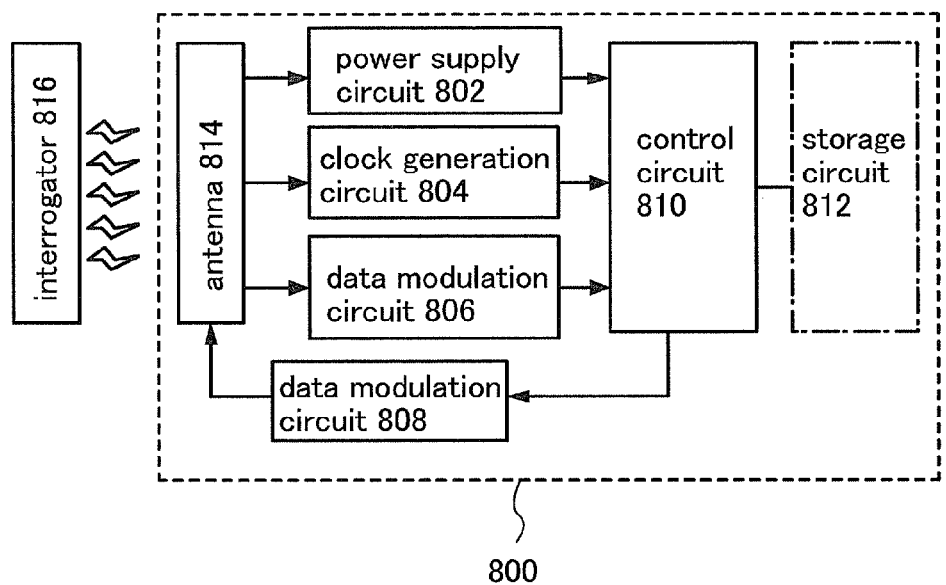

An RFID tag 800 has function for communicating data without a wire, which includes a power supply circuit 802, a clock generation circuit 804, a data demodulation circuit 806, a data modulation circuit 808, a control circuit 810 for controlling other circuits, a storage circuit 812, and an antenna 814 (see FIG. 8B). It is to be noted that the storage circuit is not necessary to be one circuit. A plurality of circuits may be used for the storage circuit, and SRAM, flash memory, ROM, FeRAM, or the like can be used. A storage circuit in which an organic compound layer is used for a storage element portion may be used.

A signal sent from a interrogator 816 as an electric wave is converted into an alternating electric signal in the antenna 814. By the power supply circuit 802, a power supply voltage is generated using the alternating electric signal and supplied to each circuit using a power supply wiring. By the clock generation circuit 804, various kinds of clock signals are generated based on the alternating signal inputted from the antenna 814 and are supplied to the control circuit 810. By the data demodulation circuit 806, the alternating electric signal is demodulated and supplied to the control circuit 810. By the control circuit 810, various kinds of arithmetic processing is conducted in accordance with the inputted signal. By the storage circuit 812, a program, data, and the like that are used by the control circuit 810 are stored. In addition, the storage circuit 812 can be used as an operation area in arithmetic processing. Then, data is sent from the control circuit 810 to the data modulation circuit 808, whereby load modulation can be added to the antenna 814 in accordance with the data from the data modulation circuit 808. The interrogator 816 receives the load modulation added to the antenna 814 by an electric wave, and as a result, the interrogator 816 can read data.

The RFID tag may have a structure in which an electric power is supplied to each circuit by an electric wave without using power supply (battery), or a structure in which power supply (battery) is mounted, and electric power may be supplied to each circuit by an electric wave and power supply (battery).

By using the structure shown in this embodiment mode, an RFID tag that can be folded can be manufactured. Accordingly, an RFID tag can be attached to a curved surface portion of a wheeled vehicle.

It is to be noted that the above method for manufacturing an RFID tag is just one example, and any RFID tags may be used as long as the function of the present invention can be secured.

In this embodiment mode, calculation of speed, examination of speeding or not, or the like are collectively conducted by the server computer. However, the structure of the present invention is not limited thereto. One or a plurality of computers (connected to the server computer and positioned at a lower part of the server computer) is assigned to an individual interrogator or interrogators in the predetermined region, and each of the interrogators and the computers are connected, whereby speed of the wheeled vehicle in the given region can be calculated. In this case, flow up to examination of speeding or not can be conducted by the computer at the lower part; therefore, the amount of information processing of the server computer can be significantly reduced.

By using the wheeled vehicle and the speed measurement system shown in this embodiment mode, crackdown on speeding can be easily conducted. That is, small-sized equipment as compared with the conventional automatic speed check equipment is used, and the equipment is easily placed in regions other than the specific region. Further, in the case of using the system of this embodiment mode, it is not necessary to photograph the drivers and the like, which is a different point from the case of using the conventional automatic speed check equipment. Therefore, it is not necessary to post a sign of placement of the automatic speed check equipment in advance. Thus, an effect of deterring driving with speed exceeding legal speed is improved, and crackdown on speeding becomes effective.

Furthermore, the speed measurement system shown in this embodiment mode has no imaging portion and is small-sized; therefore, maintenance thereof is easy and it is extremely effective for prevention of malfunction of the equipment.

In a case of comparing the system in this embodiment mode with a method for using ETC or VICS, there are advantages that power supply from the wheeled vehicle is unnecessary and that it is difficult for the possessors of the wheeled vehicles to turn ON/OFF the RFID tag. That is, it is significantly effective in conducting crackdown on speeding or the like. Since the unit price of the RFID tag is extremely cheap, if all wheeled vehicles are required to set the RFID tag by default, the charge to the possessors of the wheeled vehicle is very small. Accordingly, it is preferable to use the speed measurement system shown in this embodiment mode for crackdown on speeding or the like from the aspect of fairness.

Embodiment Mode 2

In this embodiment mode, another example of a wheeled vehicle mounted with an RFID tag and a speed measurement system using the RFID tag will be described below with reference to FIGS. 9A and 9B and FIG. 10.

Figure 9A:
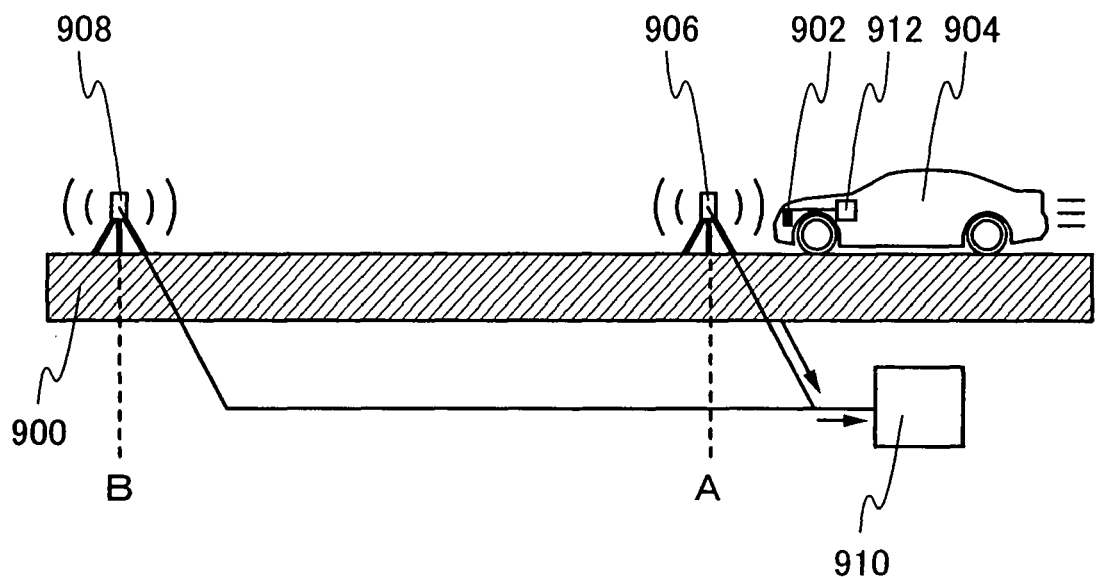
FIGS. 9A and 9B are views each illustrating a method for measuring speed of the present invention.
Figure 9B:
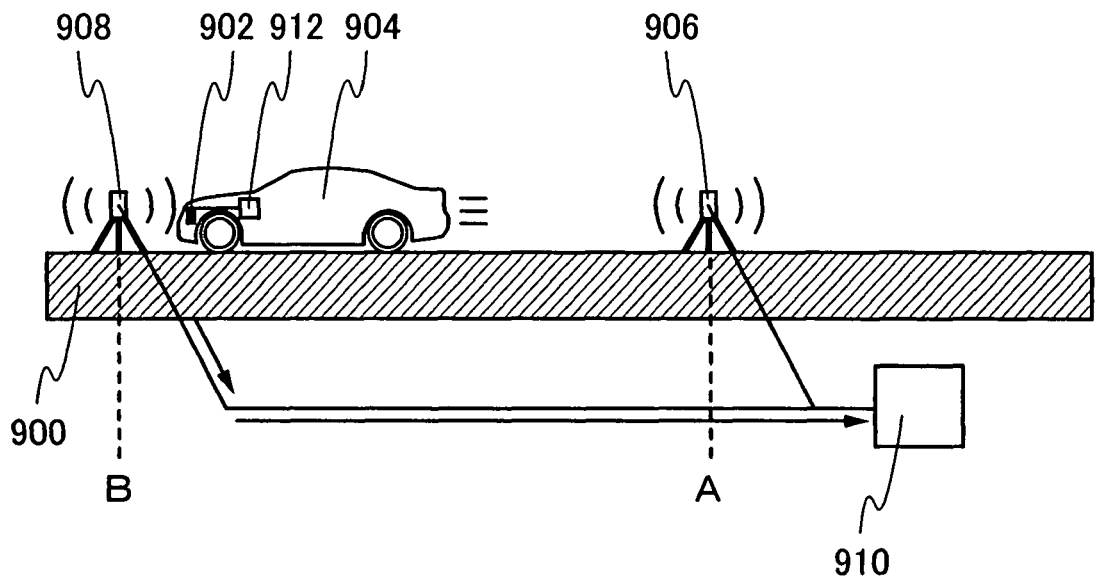

FIGS. 9A and 9B typically show a method for measuring speed of this embodiment mode. In FIGS. 9A and 9B, an RFID tag 902 having a memory portion in which unique vehicle ID is held is mounted on a wheeled vehicle 904. The wheeled vehicle 904 approaches a first interrogator 906 placed on a road 900 or passes through the first interrogator 906 (see FIG. 9A). At this time, the first interrogator 906 sends vehicle ID that is obtained by communication with the RFID tag to a server computer 910 that is network-connected. The server computer 910 holds the vehicle ID and information on date and time of the vehicle ID that is obtained by the first interrogator 906, simultaneously.

At this time, a communication device 912 set on the wheeled vehicle sends information on date and time and speed information that is uniquely measured by the wheeled vehicle to the RFID tag 902, and the RFID tag 902 holds the information. Speed information that is uniquely measured by the wheeled vehicle indicates, for example, speed information that is extracted relative to the speedometer of the wheeled vehicle or the like.

Next, the wheeled vehicle 904 approaches a second interrogator 908 or passes through the second interrogator 908 (see FIG. 9B). At this time, the server computer 910 holds the vehicle ID and information on date and time of the vehicle ID that is obtained by the second interrogator 908, simultaneously, with the similar procedure in a case of passing through the first interrogator 906.

As similar to the case of passing through the first interrogator, the communication device 912 set on the wheeled vehicle sends information on date and time and speed information that is uniquely measured by the wheeled vehicle to the RFID tag 902, and the RFID tag 902 holds the information.

After that, the server computer extracts a pair of information on date and time with the same vehicle IDs, and a difference thereof is calculated. That is, time period that is needed for the wheeled vehicle 904 driven from a point A where the first interrogator 906 is placed to a point B where the second interrogator 908 is placed is calculated.

The distance between the point A and the point B is measured in advance, and the distance is divided by the calculated time period, whereby average speed between the point A and the point B can be determined.

In a case where the average speed exceeds legal speed, the server computer holds data of date and time, place (including unique ID assigned to the interrogator), speed, excess of speed, and the like. At a later date, in accordance with the data, a notification of speeding can be sent to a possessor of the wheeled vehicle.

In a method for measuring speed in this embodiment mode, speed information that is uniformly measured by the wheeled vehicle can be held in a memory portion in the RFID tag 902 separately from speed information that is measured by the system. Thus, if malfunction of the speed measurement system occurs and examination of speeding is conducted, whether or not malfunction occurs can be verified.

In a method for measuring speed in this embodiment mode, the communication device set on the wheeled vehicle holds information on date and time and speed information in the memory portion in the RFID tag every time the wheeled vehicle and the interrogator communicates with each other. However, it is not limited thereto. For example, only when the wheeled vehicle communicates with the first interrogator or only when the wheeled vehicle communicates with the second interrogator, the communication device set on the wheeled vehicle may hold information date and time and speed information in the memory portion in the RFID tag. Alternatively, only when excess of speed is determined, information on date and time and speed information may be held in the memory portion in the RFID tag.

In the structure in which information on date and time and speed information are held only when excess of speed is determined, the server computer instantaneously determines whether or not speed is exceeded when the RFID tag communicates with the second interrogator. In a case of excess of speed, the sever computer can send a signal of excess of speed to the RFID tag through the second interrogator. The RFID tag that receives the signal of excess of speed requests information on date and time and speed information from the communication device set on the wheeled vehicle. In response, the communication device sends information on date and time and speed information that is uniquely measured by the wheeled vehicle to the RFID tag.

Naturally, a third interrogator may be provided in addition to the first interrogator and the second interrogator. In this case, after speed is measured by the first interrogator and the second interrogator, and whether or not that speed is exceeded is determined by the server computer, a signal that speed is exceeded is sent to the RFID tag by the third interrogator.

It is to be noted that information held in the RFID tag is not limited to only information on date and time and speed information. For example, information on a place where speed is exceeded and the like may be held together.

Although communication of the RFID tag and the communication device is performed by wired communication in this embodiment mode, the communication may be performed by wireless communication.

Figure 10:
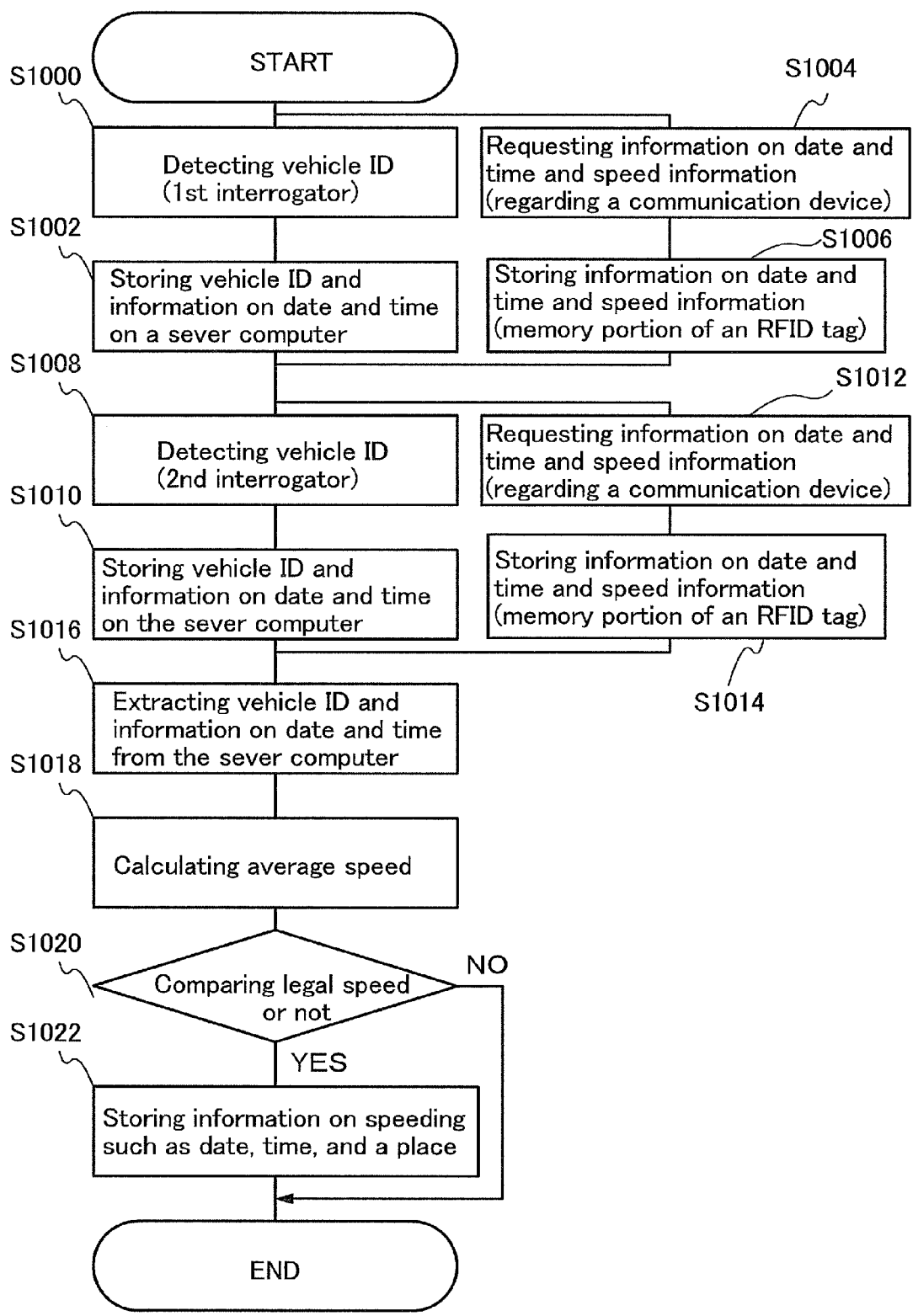
FIG. 10 is a flow chart showing a flow of calculating speed of the present invention.

FIG. 10 shows a flow chart for calculating speed of the wheeled vehicle shown in the above description.

As a step S1000, the first interrogator detects vehicle ID of the wheeled vehicle that approaches or passes through the first interrogator. As a step S1002, the first interrogator stores the vehicle ID and information on date and time on the server computer.

At the same time as communication with the first interrogator, as a step S1004, the RFID tag requests information on date and time and speed information from the communication device. As a step S1006, the RFID tag holds information on date and time and speed information from the communication device in the memory portion.

As a step S1008, the second interrogator detects vehicle ID of the wheeled vehicle that approaches or passes through the second interrogator. As a step S1010, the second interrogator stores the vehicle ID and information on date and time on the server computer.

At a same time as communication with the second interrogator, as a step S1012, the RFID tag requests information on date and time and speed information from the communication device. As a step S1014, the RFID tag holds information on date and time and speed information from the communication device in the memory portion.

After the step S1010, as a step S1016, the server computer extracts a pair of information on date and time with the same vehicle IDs. It is to be noted that the step S1016 may be conducted simultaneously with the step S1010. In this case, the server computer extracts information on the vehicle ID (information stored by the step S1002) that corresponds to the vehicle ID detected by the step S1008, and calculates speed in the subsequent step.

Next, as a step S1018, the server computer calculates time period that is needed for driving between the first interrogator and the second interrogator from the extracted information on date and time, and calculates average speed using the distance between the first interrogator and the second interrogator.

By the subsequent step S1020, the calculated average speed and legal speed are compared to examine speeding or not. Here, in a case where speeding is determined (a case of YES in FIG. 10), information on speeding such as date and time, place (including unique ID assigned to the interrogator or the like), speed, and excess of speed is stored on the server computer as a step S1022. To the contrary, in a case of not speeding, the flow is completed without storing information on speeding.

A setting portion of the RFID tag on the wheeled vehicle, a method for placing the interrogators on the road, a method for manufacturing an RFID tag, and the like are similar to those of Embodiment Mode 1. Therefore, they are omitted here.

By using the wheeled vehicle and the speed measurement system shown in this embodiment mode, crackdown on speeding becomes easy. That is, since small-sized equipment in comparison with the conventional automatic speed check equipment is used, the equipment in this embodiment mode is easily placed in regions other than the specific region. Further, it is not necessary to photograph the drivers and the like, which is a different point from the case of using the conventional automatic speed check equipment. Therefore, it is not necessary to post a sign of placement of the automatic speed check equipment in advance. Thus, an effect of deterring driving with speed exceeding excessive legal speed is improved, and crackdown on speeding becomes effective.

Furthermore, the speed measurement system shown in this embodiment mode has no imaging portion and is small-sized; therefore, maintenance thereof is easy and it is extremely effective for prevention of malfunction of the equipment.

In a case of comparing the system in this embodiment mode with a method for using ETC or VICS, there are advantages that power supply from the wheeled vehicle is unnecessary and that it is difficult for the possessors of the wheeled vehicles to turn ON/OFF the RFID tag. That is, it is significantly effective in conducting crackdown on speeding or the like. Since the unit price of the RFID tag is extremely cheap, if all wheeled vehicles are required to set the RFID tag by default, the charge to the possessors of the wheeled vehicle is very small. Accordingly, it is preferable to use the speed measurement system shown in this embodiment mode for crackdown on speeding or the like from the aspect of fairness.

Further, the wheeled vehicle shown in this embodiment mode is provided with the communication device for exchanging information with the RFID tag. Accordingly, since speed information that is uniquely measured by the wheeled vehicle can be held in the memory portion in the RFID tag, if malfunction of the speed measurement system occurs, verification of whether or not malfunction occurs can be performed.

This embodiment mode can combined with Embodiment Mode 1 as appropriate.

Embodiment Mode 3

In this embodiment mode, an example of a wheeled vehicle mounted with an RFID tag and a vehicle information system using the wheeled vehicle will be described below with reference to FIGS. 11A to 13B.

Although it is a main object of the present invention to measure speed, another useful system can be constructed using the similar structure. For example, by using unique vehicle ID for an RFID tag mounted on a wheeled vehicle, a system that can be used for finding a stolen vehicle can be constructed. In addition, a system by which tracking a desired wheeled vehicle can be easily performed can be constructed.

Figure 11A:
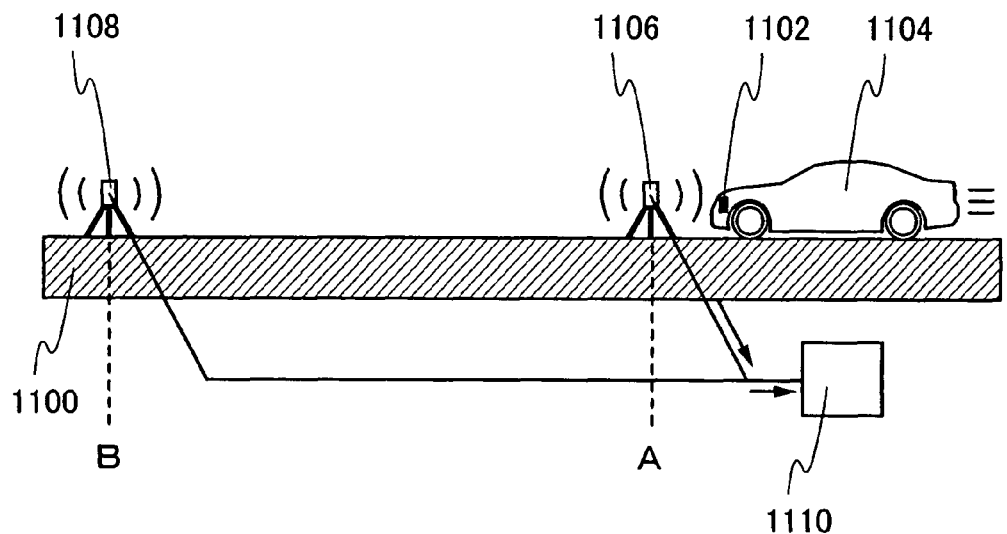
FIGS. 11A to 11C are views each illustrating a method for tracking a stolen vehicle of the present invention.
Figure 11B:
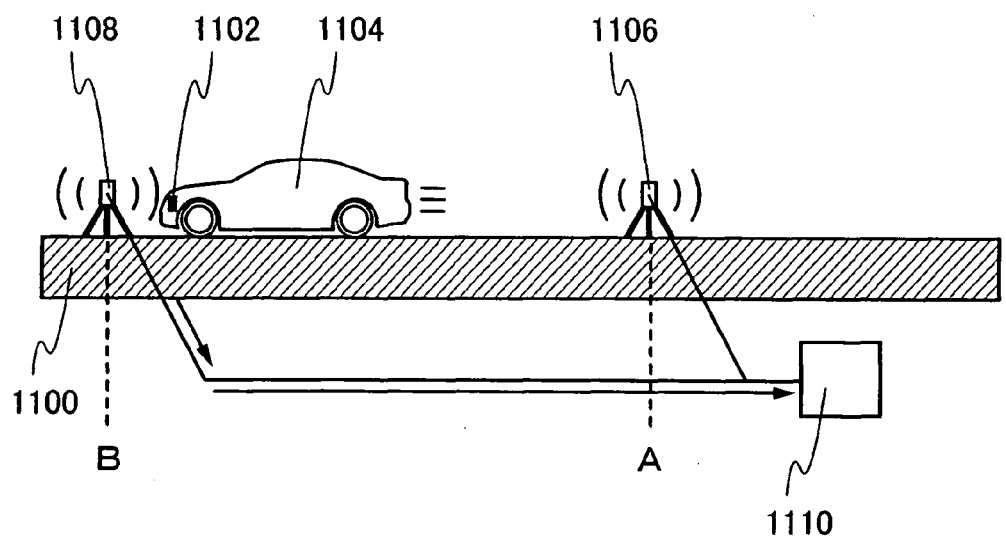
Figure 11C:
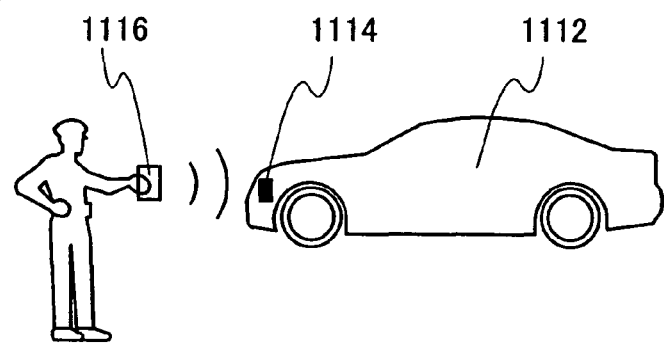

FIGS. 11A to 11C schematically show a system that can be used for finding a stolen vehicle or the like. In FIGS. 11A to 11C, an RFID tag 1102 having a memory portion where unique vehicle ID is held is mounted on a wheeled vehicle 1104. The wheeled vehicle 1104 approaches a first interrogator 1106 placed on a road 1100 or passes through the first interrogator 1106 (see FIG. 11A). At this time, the first interrogator 1106 sends vehicle ID that is obtained by communication with the RFID tag to a server computer 1110 that is network-connected. The server computer 1110 examines whether or not the vehicle ID is vehicle ID of a stolen vehicle. In a case where it is vehicle ID of the stolen vehicle, the server computer 1110 stores information on date and time of the stolen vehicle passing through the first interrogator 1106.

Next, the wheeled vehicle 1104 approaches a second interrogator 1108 or passes through the second interrogator 1108 (see FIG. 11B). At this time, the server computer 1100 obtain vehicle ID with the similar procedure in the case of passing though the first interrogator 1106. In the case where the vehicle ID is vehicle ID of the stolen vehicle, the server computer also stores information on date and time of the stolen vehicle passing.

Thus, the direction of the driven stolen vehicle can be examined. By providing the interrogator of the present invention on a major road, it becomes possible to specify a region where the stolen vehicle is present.

After the region where the stolen vehicle is present is almost restricted by the above system, the stolen vehicle is searched using the interrogator exchanging information with the RFID tag set on the wheeled vehicle, whereby effort and cost spent for search and the like can be drastically reduced. Since the interrogator for exchanging information with the RFID tag set on the wheeled vehicle is small-sized equipment, the interrogator can be carried by police officers and the like in patrol. Accordingly, it is effective for find the stolen vehicle and the like. For example, in FIG. 11C, when an RFID tag 1114 is mounted on a stolen vehicle 1112, whether or not the wheeled vehicle is the stolen vehicle can be easily examined by a portable interrogator 1116.

The structures shown in FIGS. 11A and 11B are basically similar to the structure of the speed measurement system described in Embodiment Mode 1. That is, at the same time of examination of whether or not the wheeled vehicle is the stolen vehicle, speed may also be measured. It is to be noted that, in a system that is used for finding the stolen vehicle, an RFID tag having a memory portion in which information on the stolen vehicle can be written is mounted on the wheeled vehicle, whereby information on the stolen vehicle may be written in the RFID tag when passing through the first interrogator or the second interrogator.

Figure 12:
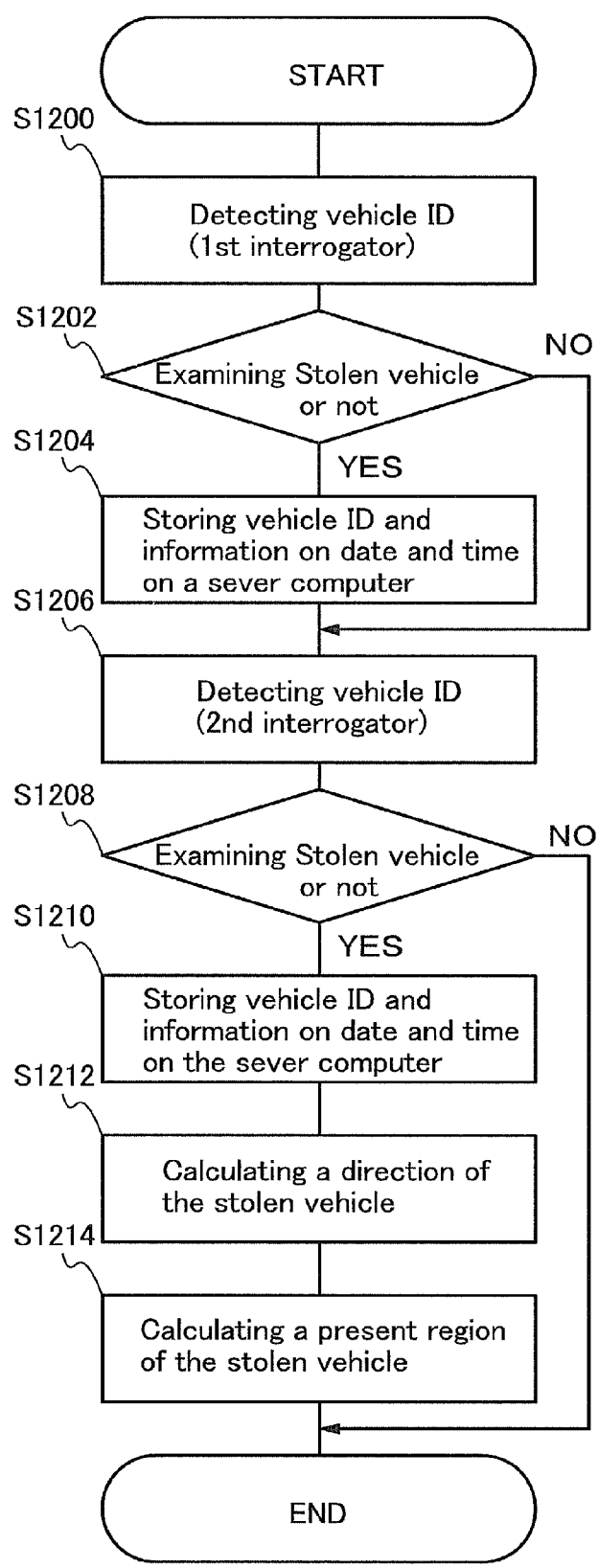
FIG. 12 is a flow chart showing a flow of tracking a stolen vehicle of the present invention.

FIG. 12 shows a flow chart for examining whether or not the wheeled vehicle is the stolen vehicle shown in the above description.

As a step S1200, the first interrogator detects vehicle ID of the wheeled vehicle that approaches or passes through the first interrogator. As a step S1202, the first interrogator examines whether or not the detected vehicle ID is that of the stolen vehicle. In a case where the detected vehicle ID is that of the stolen vehicle, the server computer stores the vehicle ID and information on date and time as a step S1204. In a case where the detected vehicle ID is not that of the stolen vehicle, the server computer does not store the vehicle ID and the information on date and time, and the flow proceeds to next step.

Next, as a step S1206, the second interrogator detects vehicle ID of the wheeled vehicle that approaches or passes through the second interrogator. As a step S1208, the second interrogator examines whether or not the detected vehicle ID is that of the stolen vehicle. In a case where the detected vehicle ID is that of the stolen vehicle, the server computer stores the vehicle ID and information on date and time as a step S1210. In a case where the detected vehicle ID is not that of the stolen vehicle, the server computer does not store the vehicle ID and information on date and time, and the flow is completed.

After that, as a step S1212, by comparing a pair of information on date and time with the same detected vehicle IDs by the first interrogator and the second interrogator, calculation of the direction of the driven stolen vehicle is performed. When a interrogator that can be used for this system is provided on a major road, the region where the wheeled vehicle is present can almost be examined; therefore, the present region of the wheeled vehicle is calculated as a step S1214.

When the vehicle ID detected by the step S1202 is not that of the stolen vehicle, FIG. 12 shows that the flow proceeds to next step. However, the flow may be completed by the step S1202.

Figure 13A:
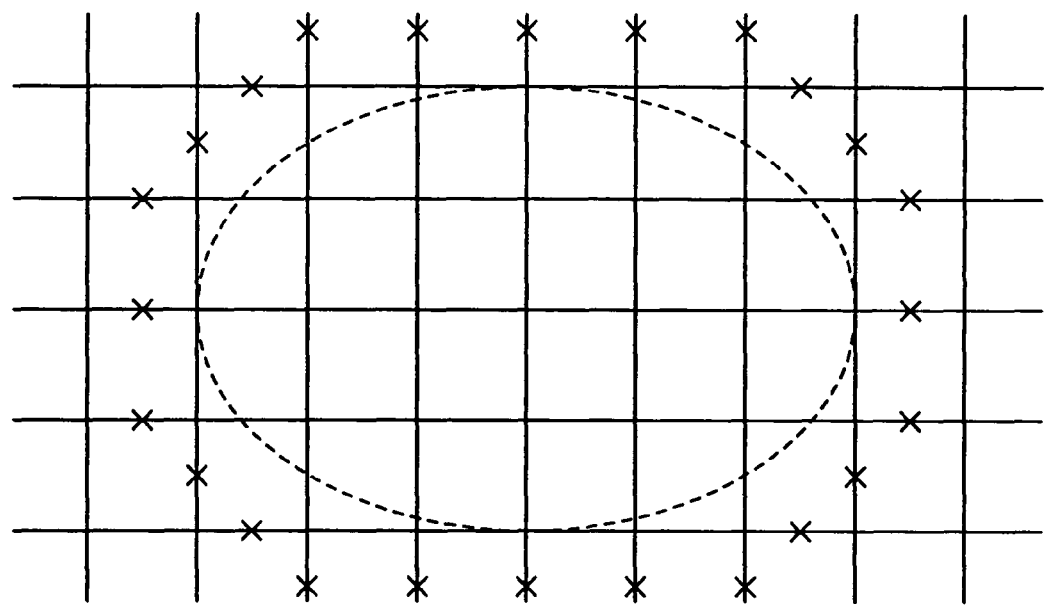
FIGS. 13A and 13B are views each showing a placement example of a interrogator of the present invention.
Figure 13B:
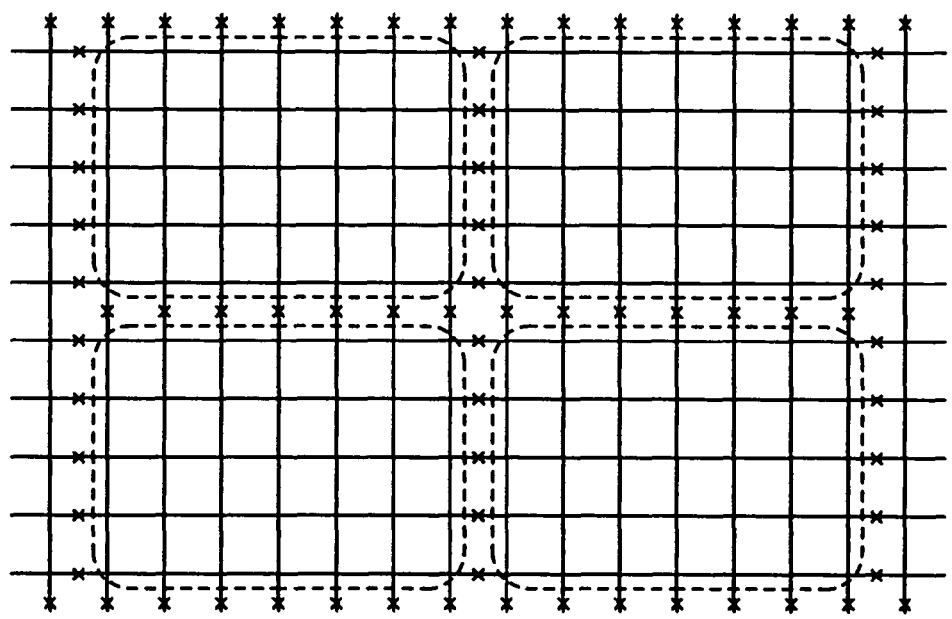

In FIGS. 13A and 13B, an example in which interrogators are placed on a major road is shown. In FIGS. 13A and 13B, "x" marks indicate the placement of the interrogators. When the interrogators are placed as in FIG. 13A, whether or not the stolen vehicle is present in a region indicated by the broken line in the drawing can be examined.

In FIG. 13B, another example of placement of interrogators is shown. As shown in FIG. 13B, by providing the interrogators on a major road, the region where the stolen vehicle is present can be examined. Although the case in which the roads are set out neatly in a grid for convenience is shown in FIGS. 13A and 13B, it is not limited thereto. The partition of the regions is not limited to the examples shown in FIGS. 13A and 13B.

A setting portion of the RFID tag on the wheeled vehicle, a method for placing the interrogators on the road, a method for manufacturing an RFID tag, and the like are similar to those of Embodiment Mode 1. Therefore, they are omitted here.

By using the system shown in this embodiment mode, the stolen vehicle can be easily found. The system shown in this embodiment mode has no imaging portion and is small-sized; therefore, maintenance thereof is easy and it is extremely effective for prevention of malfunction of the equipment.

Further, a car-mount device that needs power supply from the wheeled vehicle is unnecessary, and it is extremely difficult for the possessors of the wheeled vehicles to turn ON/OFF the RFID tag. That is, it is significantly advantageous to track the desired wheeled vehicle in finding the stolen vehicle. Since the unit price of the RFID tag is extremely cheap, if all wheeled vehicles are required to set the RFID tag by default, the charge to the possessors of the wheeled vehicle is very small. Accordingly, it is preferable to use the speed measurement system shown in this embodiment mode from the aspect of fairness.

The interrogator for exchanging information with the RFID tag set on the wheeled vehicle, which is used in this system, is small-sized equipment, and it can be carried by police officers and the like in patrol. Therefore, the stolen vehicle can be easily found by using this system. In addition, the desired wheeled vehicle can be easily tracked.

This embodiment mode can be combined with Embodiment Mode 1 or 2 as appropriate.

Embodiment Mode 4

In the system of the present invention, it is necessary to send and receive a signal between an RFID tag and a interrogator in a short time of a wheeled vehicle passing. Therefore, in order to improve response speed of the RFID tag, it is preferable to have a power supply in the RFID tag itself. In this embodiment mode, a structure of the RFID tag, which have a battery capable of being charged by wireless communication, and the interrogator will be described with reference to FIGS. 14A to 15B.

Figure 14A:
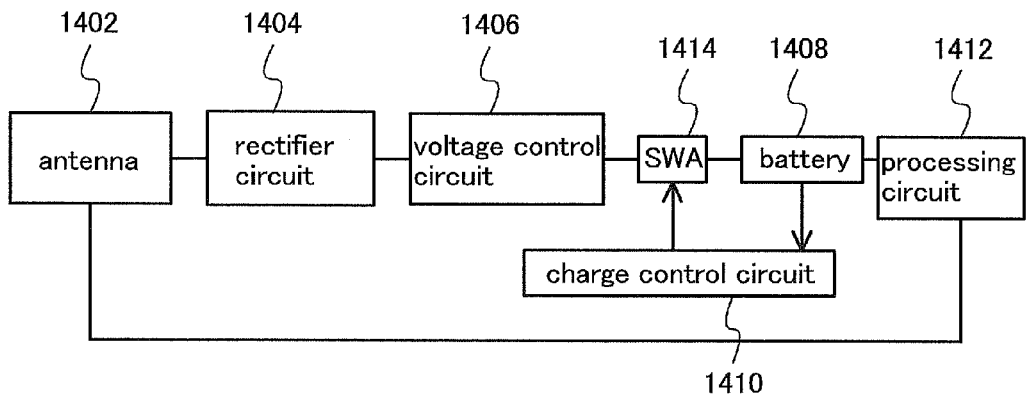
FIGS. 14A to 14C are views each illustrating a structure of an RFID tag and a interrogator of the present invention.

As shown in FIG. 14A, an RFID tag described in this embodiment mode has an antenna (or an antenna and a capacitor (also referred to as a resonant capacitor)) 1402, a rectifier circuit 1404, a voltage control circuit (also referred to as a regulator) 1406, a battery 1408, a charge control circuit 1410, and a processing circuit 1412 for performing information processing of the wire communication or the like. An output of the antenna 1402 is connected to an input of the rectifier circuit 1404, and an output of the rectifier circuit is connected to an input of the voltage control circuit 1406. An output of the voltage control circuit 1406 is connected to an input of the battery 1408 through a switch A 1414. The charge control circuit 1410 is connected to the battery 1408 to monitor a charge condition of the battery 1408, and in response to the condition, the charge control circuit 1410 controls ON/OFF of the switch A 1414.

Here, a structure in which a diode is used as the switch A 1414 and the charge control circuit 1410 is omitted may be employed. The voltage control circuit 1406 may be a control circuit of a voltage and a current.

Figure 14B:
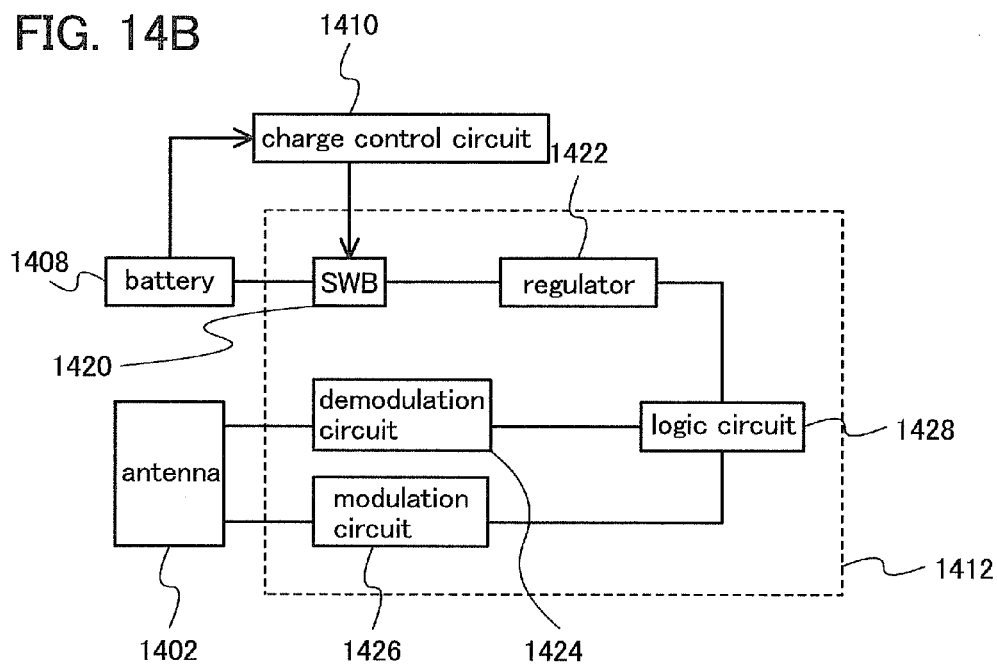

Next, an example of a structure of the processing circuit 1412 is shown in FIG. 14B. The processing circuit 1412 may have a structure that includes a regulator 1422 connected to the battery 1408 through a switch B 1420, a demodulation circuit 1424 and a modulation circuit 1426 connected to the antenna 1402, and a logic circuit 1428. The logic circuit 1428 includes a plurality of circuits having functions of demodulation, arithmetic, storage, and the like.

The battery 1408 is connected to the processing circuit 1412 through the switch B 1420. The switch B 1420 is controlled depending on a charge condition of the battery 1408 similarly to that of the switch A 1414. For example, when the voltage of the battery 1408 becomes a value of $V_1$ or more, the switch B 1420 is turned On. When the voltage of the battery 1408 becomes a value $V_2$ ($V_1 > V_2$) or less by consuming the power of the battery, the switch B 1420 is turned OFF. The $V_1$ may be a voltage enough to drive the processing circuit 1412 connected to the battery 1408 or the like, and $V_2$ may be a minimum voltage needed for driving.

Figure 14C:
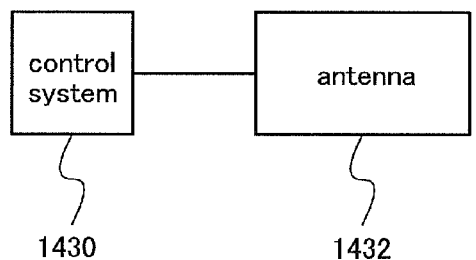

Next, an example of a interrogator that can communicate with the RFID tag and charge the battery is shown in FIG. 14C. The interrogator includes a control system 1430 and an antenna (or an antenna and a capacitor) 1432.

Figure 15A:
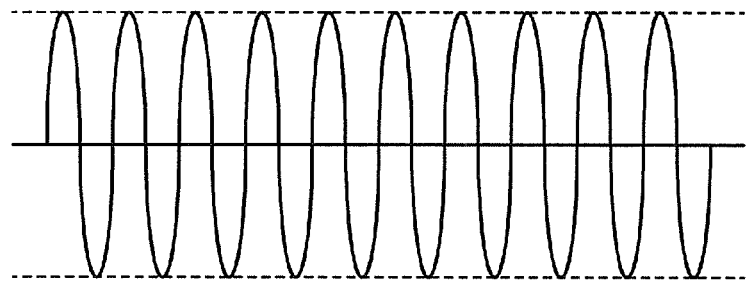
FIGS. 15A and 15B are views showing a flow and the like of charging an RFID tag of the present invention.
Figure 15B:
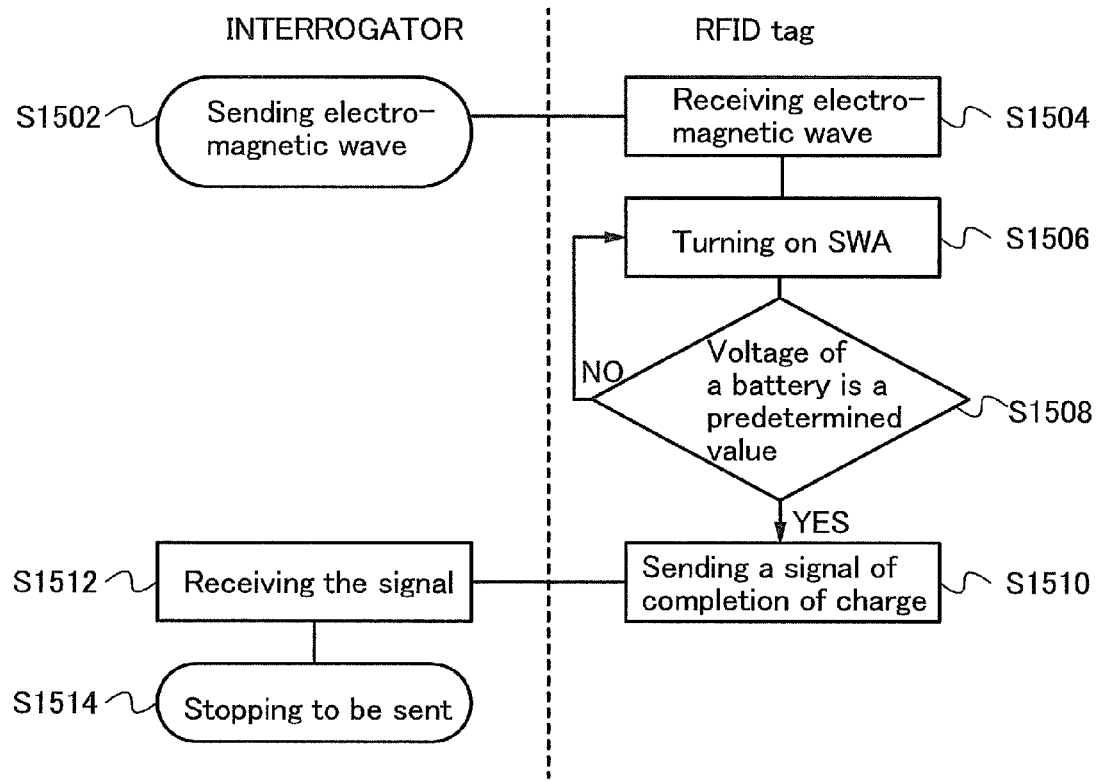

As the simplest example in which the battery of the RFID tag is charged from the interrogator, communication is performed using an electromagnetic wave with equivalent amplitudes as shown in FIG. 15A. A method for charge at this time is shown in a flow chart of FIG. 15B.

First, as a step S1502, an electromagnetic wave with equivalent amplitudes starts to be sent from an antenna of a charger. When the RFID tag receives the electromagnetic wave as a step S1504, the switch A turns ON as a step S1506, and the charge to battery starts. At this time, the charge control circuit monitors a charge condition to the battery as a step S1508. When a voltage of the battery becomes a predetermined value (given value) or more (YES), the RFID tag sends a signal of completion of the charge as a step S1510. The interrogator receives the signal as a step S1512, and the electromagnetic wave stops to be sent as a step S1514. When the voltage of the battery does not reach a predetermined value (NO), the flow returns to the step S1506, and the charge is continuously performed.

By using the RFID tag and the interrogator shown in this embodiment mode, a signal in the system of the present invention can be sent and received more accurately and quickly. Thus, probability of malfunction of the system can be further reduced.

The interrogator shown in this embodiment mode is small-sized equipment as compared with the conventional automatic speed check equipment, and it is easy to place in regions other than the specific region. Further, the interrogator has no imaging portion and is small-sized; therefore, maintenance thereof is easy and it is extremely effective for prevention of malfunction of the equipment.

This embodiment mode can be combined with Embodiment Modes 1 to 3 as appropriate.

Embodiment Mode 5

In this embodiment mode, another example of a wheeled vehicle mounted with an RFID tag and an information system using the wheeled vehicle will be described.

Although it is a main object of a speed measurement system of the present invention to measure speed, another useful system can be constructed using a similar structure. For example, by holding information such as accident histories and restoration histories of the wheeled vehicle in an RFID tag, histories such as accident histories and restoration histories of the wheeled vehicle, which is difficult to be discriminated, can be easily obtained.

As another example, an example in which information such as tax payment and penalty payment is held in an RFID can be given. Accordingly, it becomes easy to collect tax and penalty in a case where the tax and the penalty are not paid. Further, by placing interrogators as appropriate in a parking area, information on placement of wheeled vehicles can be easily checked. Further, by holding information on date and time of the wheeled vehicles in the parking area coupled with turning ON/OFF of an engine thereof, whether or not the wheeled vehicles are derelict vehicles of illegally parked (parking duration) can be easily be determined. Furthermore, by providing the RFID tag for the wheeled vehicle, management capability of the wheeled vehicles by manufacturers and the like is improved.

The interrogator that can be used in this embodiment mode is small-sized equipment, and it can be placed in various places without selecting setting positions. In addition, the interrogator is easily carried because the size thereof is small. Further, it becomes a big advantage of the RFID tag that supply of power from the wheeled vehicle is unnecessary as compared with the existing equipment such as ETC and VICS. Therefore, various systems can be constructed as shown in this embodiment mode.

This embodiment mode can be combined with Embodiment Modes 1 to 4 as appropriate.

Embodiment Mode 6

In this embodiment mode, an example of using a wheeled vehicle mounted with an RFID tag, an information system of the wheeled vehicle, and the existing automatic speed check equipment will be described.

By using the system of the present invention combined with the existing automatic speed check equipment, the system of the present invention can be supplemented. For example, identification information on a wheeled vehicle can be detected by the system of the present invention, and the registration number (car registration plate) of a wheeled vehicle can be detected by the existing automatic speed check equipment. Accordingly, even when identification information on a wheeled vehicle that is held in the RFID tag and the registration number of a wheeled vehicle do not correspond to each other, in other words, the car registration number is altered in the stolen vehicle, the wheeled vehicle can be easily found. Also, if the system of the present invention does not function because of breakdown of the RFID tag, the wheeled vehicle of an RFID tag which does not function can be distinguished using the existing automatic speed check equipment. Similarly, it is possible to set an RFID tag thoroughly by distinguishing the wheeled vehicles on which an RFID tag is not set.

It is to be noted that various combinations of the system of the present invention and the existing automatic speed check equipment are employed, and the combination is not particularly limited. For example, the system of the present invention can be placed in the same region where the existing automatic speed check equipment is placed.

This embodiment mode can be combined with Embodiment Modes 1 to 5 as appropriate.

The present invention can have various structures other than the structure shown in the embodiment modes in accordance with the purpose. Therefore, the usage of the wheeled vehicle and the system shown in the present invention is not limited to description of this specification.

This application is based on Japanese Patent Application serial no. 2006-257822 filed in Japan Patent Office on Sep. 22, 2006, the entire contents of which are hereby incorporated by reference.

The invention claimed is:

1. A wheeled vehicle comprising:
   an RFID tag comprising a memory portion, a battery configured to be charged, and a charge control circuit,
   wherein the memory portion is configured to hold identification information on the wheeled vehicle,
   wherein the RFID tag is configured to send the identification information to an interrogator in a case of receiving a signal from the interrogator, and
   wherein, in the case of receiving the signal from the interrogator, the charge control circuit is configured to examine whether or not a voltage of the battery reaches a given value, and to charge the battery in a case the voltage of the battery does not reach the given value.

2. The wheeled vehicle according to claim 1, further comprising:
   a communication device set on the wheeled vehicle,
   wherein the communication device is configured to send speed information that is measured by the wheeled vehicle to the interrogator, in a case where the RFID tag communicates with the interrogator, and
   wherein the memory portion is configured to hold the speed information that is measured by the wheeled vehicle.

3. The wheeled vehicle according to claim 1,
   wherein the RFID tag comprises a thin film integrated circuit sealed with a first base and a second base, and
   wherein each of the first base and the second base is an antistatic film.

4. The wheeled vehicle according to claim 1,
wherein the RFID tag is attached to or embedded in any of a mirror portion, a light portion, or a window portion of the wheeled vehicle.

5. The wheeled vehicle according to claim 1,
wherein the identification information includes any of speed information, information on date and time, information on theft, information on accident history, information on restoration history, information on tax payment, and information on penalty payment.

6. An RFID tag comprising:
a memory portion;
a battery configured to be charged; and
a charge control circuit,
wherein the memory portion is configured to hold identification information on a wheeled vehicle,
wherein the RFID tag is configured to send the identification information to an interrogator in a case of receiving a signal from the interrogator, and
wherein, in the case of receiving the signal from the interrogator, the charge control circuit is configured to examine whether or not a voltage of the battery reaches a given value, and to charge the battery in a case the voltage of the battery does not reach the given value.

7. The RFID tag according to claim 6, further comprising:
a thin film integrated circuit sealed with a first base and a second base, and
wherein each of the first base and the second base is an antistatic film.

8. The RFID tag according to claim 6,
wherein the identification information includes any of speed information, information on date and time, information on theft, information on accident history, information on restoration history, information on tax payment, and information on penalty payment.

9. A speed measurement system comprising:
a first interrogator configured to detect first identification information on an RFID tag set on a wheeled vehicle;
a second interrogator configured to detect second identification information on the RFID tag set on the wheeled vehicle;
a computer that is connected to the first interrogator and the second interrogator,
wherein the second interrogator is placed to have a given distance from the first interrogator,
wherein the second interrogator is configured to detect the second identification information, after the first interrogator detects first identification information,
wherein the computer is configured to hold first timing information on date and time in detecting the first identification information,
wherein the computer is configured to hold second timing information on date and time in detecting the second identification information,
wherein the computer is configured to calculate average speed of the wheeled vehicle between the first interrogator and the second interrogator, by the first timing information, the second timing information and the given distance,
wherein the RFID tag comprises a memory portion, a charge control circuit and a battery configured to be charged, and
wherein, when the RFID tag receives a signal from at least one of the first interrogator and the second interrogator, the charge control circuit is configured to examine whether or not a voltage of the battery reaches a given value and to charge the battery in a case the voltage of the battery does not reach the given value.

10. The speed measurement system according to claim 9,
wherein the computer is a server computer or a computer connected to a lower part of the server computer.

11. The speed measurement system according to claim 9,
wherein the wheeled vehicle comprises a communication device,
wherein the communication device is configured to send speed information that is measured by the wheeled vehicle to at least one of the first interrogator and the second interrogator, in a case where the RFID tag communicates with the interrogator, and
wherein the memory portion is configured to hold the speed information that is measured by the wheeled vehicle.

12. The speed measurement system according to claim 9,
wherein the RFID tag comprises a thin film integrated circuit sealed with a first base and a second base, and
wherein each of the first base and the second base is an antistatic film.

13. The speed measurement system according to claim 9,
wherein the RFID tag is configured to hold any of identification information on a wheeled vehicle, speed information, information on date and time, information on theft, information on accident history, information on restoration history, information on tax payment, and information on penalty payment.

* * * * *